US012717123B2

(12) United States Patent
Shimomura

(10) Patent No.: US 12,717,123 B2
(45) Date of Patent: Aug. 25, 2026

(54) ZOOM LENS AND IMAGE PICKUP APPARATUS

(71) Applicant: CANON KABUSHIKI KAISHA, Tokyo (JP)

(72) Inventor: Kazuya Shimomura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 18/170,464

(22) Filed: Feb. 16, 2023

(65) Prior Publication Data

US 2023/0266574 A1 Aug. 24, 2023

(30) Foreign Application Priority Data

Feb. 21, 2022 (JP) ................................ 2022-024542

(51) Int. Cl.
*G02B 15/14* (2006.01)

(52) U.S. Cl.
CPC ................ *G02B 15/145129* (2019.08); *G02B 15/144113* (2019.08); *G02B 15/1461* (2019.08)

(58) Field of Classification Search
CPC .... G02B 15/145129; G02B 15/144113; G02B 15/1461
See application file for complete search history.

(56) References Cited

U.S. PATENT DOCUMENTS

2015/0378134 A1 12/2015 Koga
2019/0265447 A1 8/2019 Hori et al.
2019/0265448 A1 8/2019 Ogawa et al.
2021/0088764 A1* 3/2021 Ota ........................ G02B 15/22

FOREIGN PATENT DOCUMENTS

JP 2014081464 A 5/2014
JP 2016109952 A 6/2016
JP 2021047380 A 3/2021
JP 2021056491 A 4/2021
JP 2021063885 A 4/2021

* cited by examiner

*Primary Examiner* — George G. King
(74) *Attorney, Agent, or Firm* — Canon U.S.A., Inc. IP Division

(57) ABSTRACT

A zoom lens including from object side: a positive first unit; at least one negative unit moving toward image side for zooming from wide to telephoto; and at least two positive units each moving toward object side for the zooming, in which the positive first unit includes a biconcave lens closest to object side, in which an N unit is one of the at least one negative unit and having largest amount of movement during the zooming, and P unit is one of the at least two positive units having largest amount of movement during the zooming; in which focal lengths of the first lens unit, of the zoom lens at wide end and telephoto end, a difference between distances from the N unit to image plane at telephoto end and at wide end and a distance from the P unit to image plane at telephoto end are appropriately set.

15 Claims, 15 Drawing Sheets

I
P
L5
SP
L4
L3
L2
L12
L1
L11

M S
e g
Fno=1.76
ω=34.8°
ω=34.8°
ω=34.8°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M S
e g
Fno=1.76
ω=1.51°
ω=1.51°
ω=1.51°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M S
e g
Fno=5.34
ω=0.307°
ω=0.307°
ω=0.307°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M------ S
e g
Fno=1.77
ω=33.9°
ω=33.9°
ω=33.9°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M------ S
e g
Fno=1.76
ω=1.21°
ω=1.21°
ω=1.21°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M------ S
e g
Fno=5.8
ω=0.275°
ω=0.275°
ω=0.275°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

I
P
L6
SP
L5
L4
L3
L2
L12
L1
L11

M S
e g
Fno=1.77
ω=32.9°
ω=32.9°
ω=32.9°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M S
e g
Fno=1.76
ω=1.5°
ω=1.5°
ω=1.5°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M S
e g
Fno=7
ω=0.232°
ω=0.232°
ω=0.232°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

FIG. 11

M S
e g
Fno=1.76
ω=34.2°
ω=34.2°
ω=34.2°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M S
e g
Fno=1.77
ω=1.25°
ω=1.25°
ω=1.25°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M S
e g
Fno=6.08
ω=0.269°
ω=0.269°
ω=0.269°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

L6
P
SP
L5
L4
L3
L2
L12
L1
L11
I

M S
e g
Fno=1.76
ω=34.2°
ω=34.2°
ω=34.2°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M S
e g
Fno=1.76
ω=1.43°
ω=1.43°
ω=1.43°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

M S
e g
Fno=6.08
ω=0.269°
ω=0.269°
ω=0.269°
-0.400 0.400
SPHERICAL ABERRATION
-0.400 0.400
ASTIGMATISM
-10.000 10.000
DISTORTION (%)
-0.100 0.100
CHROMATIC ABERRATION OF MAGNIFICATION

ZOOM LENS AND IMAGE PICKUP APPARATUS

BACKGROUND OF THE INVENTION

Field of the Invention

The present invention relates to a zoom lens and an image pickup apparatus.

Description of the Related Art

There is a demand for a compact zoom lens having a wide angle of view, a high zoom ratio, and a high optical performance in an image pickup apparatus such as a television camera, a movie camera, or a photographic camera. In addition, there is a demand for a zoom lens to have a high resolution over an entire image pickup region of a high-resolution image pickup device in a camera for professional use.

The zoom lens disclosed in Japanese Patent Application Laid-Open No. 2021-47380 and Japanese Patent Application Laid-Open No. 2014-81464 includes, in order from an object side to an image side, a first lens unit having a positive refractive power, a second lens unit having a negative refractive power, a third lens unit having a positive refractive power, a fourth lens unit having a positive refractive power, and a fifth lens unit having a positive refractive power. In the zoom lens, the second to fourth lens units are moved for zooming.

In order to obtain a zoom ratio exceeding 130 in the above-described zoom lens, it is difficult to correct a chromatic aberration at a telephoto end.

SUMMARY OF THE INVENTION

The present invention provides a zoom lens which is beneficial in terms of, for example, a wide angle of view, a high zoom ratio, compactness, and high optical performance over an entire zoom range.

According to an aspect of the present invention, a zoom lens includes in order from an object side to an image side: a first lens unit having a positive refractive power and configured not to move for zooming; at least one lens unit having a negative refractive power and configured to move toward the image side for zooming from a wide angle end to a telephoto end; and at least two lens units each having a positive refractive power and configured to move toward the object side for zooming from the wide angle end to the telephoto end, in which the first lens unit includes a biconcave lens disposed closest to the object side, in which a lens unit included in the at least one lens unit having the negative refractive power and having a largest amount of movement during zooming from the wide angle end to the telephoto end is defined as an N lens unit, and a lens unit included in the at least two lens units each having the positive refractive power and having a largest amount of movement during zooming from the wide angle end to the telephoto end is defined as a P lens unit; and in which the following inequalities are satisfied, $$4.35 < ft/f1 < 6.00$$

$$1.0 < |mn/mp| < 2.0$$

$$0.02 < fw/f1 < 0.05$$

where f1 represents a focal length of the first lens unit, fw represents a focal length of the zoom lens at the wide angle end, ft represents a focal length of the zoom lens at the telephoto end, mn represents a difference between a distance from the N lens unit to an image plane at the wide-angle end and a distance from the N lens unit to the image plane at the telephoto end, and mp represents a difference between distances from the P lens unit to the image plane at the wide-angle end and a distance from the P lens unit to the image plane at the telephoto end.

Further features of the present invention will become apparent from the following description of embodiments with reference to the attached drawings.

BRIEF DESCRIPTION OF THE DRAWINGS

FIG. 11 is a lens sectional view when focusing on the object at infinity at the wide angle end according to Numerical Embodiment 6.

DESCRIPTION OF THE EMBODIMENTS

Figure 1:
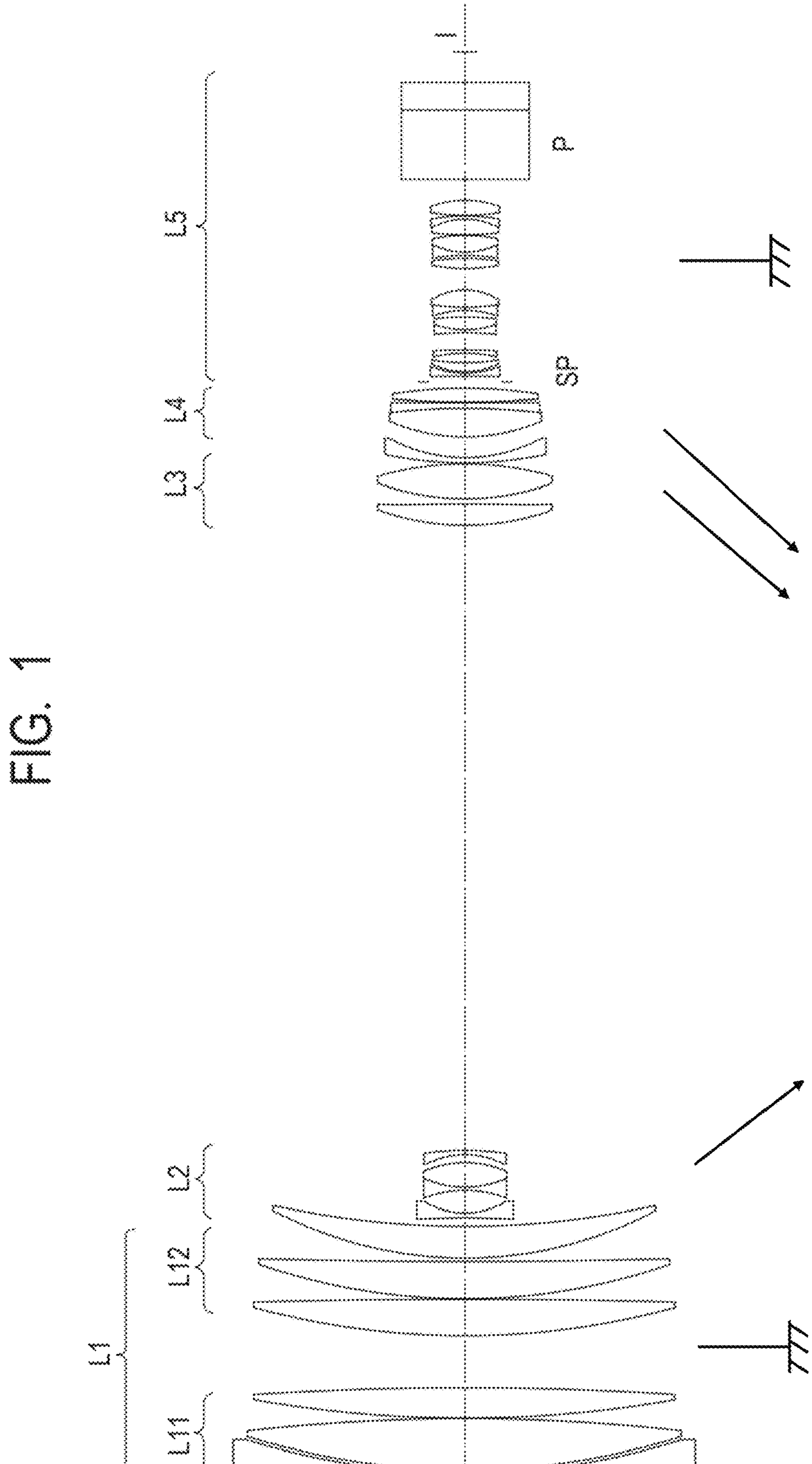
FIG. 1 is a lens sectional view when focusing on an object at infinity at a wide angle end according to Numerical Embodiment 1.

Hereinafter, preferred embodiments of the present invention will be described in detail with reference to the accompanying drawings. Each of the embodiments of the present invention described below can be implemented solely or as a combination of a plurality of the embodiments or features thereof where necessary or where the combination of elements or features from individual embodiments in a single embodiment is beneficial.

First, features of the zoom lens according to the present invention will be described with reference to inequalities. In the zoom lens of the present invention, in order to achieve the wide angle of view, the high zoom ratio, the compactness and light weight, and the high optical performance over the entire zoom range, a refractive power of the first lens unit and an amount of movement of the lens unit that moves for zooming are specified.

The zoom lens according to the present invention includes, in order from an object side to an image side: a first lens unit having a positive refractive power that is configured not to move for zooming, at least one lens unit having a negative refractive power that is configured to move toward an image side for zooming from the wide angle end to the telephoto end, and at least two lens units having a positive refractive power that is configured to move toward the object side for zooming from the wide angle end to the telephoto end. A lens closest to the object side in the first lens unit is a biconcave lens. The first lens unit L1 includes a first lens subunit L11 that is configured not to move for focusing, and a second lens subunit L12 having a positive refractive power that is configured to move for focusing from the infinity side to the close side. The zoom lens satisfies the following inequalities.

$$4.35 < ft/f1 < 6.00 \tag{1}$$

$$1.0 < |mn/mp| < 2.0 \tag{2}$$

$$0.02 < fw/f1 < 0.05 \tag{3}$$

where f1 represents a focal length of the first lens unit, fw represents a focal length at the wide-angle end, ft represents a focal length at the telephoto end, and mn represents a differences between positions of an N lens unit on an optical axis from the image plane at the wide-angle end and the telephoto end, and mp represents a difference between positions of a P lens unit on the optical axis from the image plane at the wide-angle end and the telephoto end, where the N lens unit is a lens unit having a largest movement amount among the at least one lens unit having a negative refractive power that is configured to move toward the image side for zooming from the wide angle end to the telephoto end, and the P lens unit is a lens unit having a largest movement amount among the at least two lens unit having a positive refractive power that is configured to move toward the object side for zooming from the wide angle end to the telephoto end.

With this configuration, the zoom lens according to the present invention has an angle of view at the wide-angle end of approximately 60 to 70 degrees, an angle of view at the telephoto end of approximately 0.4 to 0.7 degrees, and a zoom ratio of approximately 130 to 160, and can realize high optical performance with a small size and a light weight.

The inequality (1) defines a ratio between the focal length at the telephoto end and the focal length of the first lens unit. The inequality (2) defines a ratio of the amount of movement of the lens unit having a negative refractive power that is configured to move toward the image side for zooming from the wide angle end to the telephoto end and the amount of movement of the lens unit having a positive refractive power that is configured to move toward the object side for zooming from the wide angle end to the telephoto end. The inequalities (1) and (2) are defined in order to achieve both miniaturization of the zoom lens and a correction of axial chromatic aberration while achieving a high zoom ratio. When the condition of the upper limit of the inequality (1) is not satisfied, it is advantageous for downsizing of the zoom lens, but a magnification ratio of an aberration generated in the first lens unit becomes large, so that it becomes difficult to favorably correct the optical performance at the telephoto end, particularly the axial chromatic aberration. On the other hand, when the condition of the lower limit of the inequality (1) is not satisfied, the refractive power of the first lens unit becomes weak, so that it becomes difficult to achieve both a high zoom ratio and a miniaturization of the zoom lens.

When the condition of the upper limit of the inequality (2) is not satisfied, the amount of movement of the N lens unit having a negative refractive power becomes large, so that a lateral magnification of the N lens unit at the telephoto end becomes large, and an axial chromatic aberration generated in the N lens unit becomes large. Therefore, it becomes difficult to satisfactorily correct the optical performance at the telephoto end, particularly the axial chromatic aberration. On the other hand, when the condition of the lower limit of the inequality (2) is not satisfied, since the movement amount of the N lens unit which is a main zoom unit becomes small, the sum of movement amounts of the N lens unit and the P lens unit becomes large, and it becomes difficult to miniaturize the zoom lens.

The inequality (3) defines a ratio between the focal length at the wide-angle end and the focal length of the first lens unit. The conditions of the upper and lower limits of the inequality (3) are defined in order to reduce the size of the zoom lens and satisfactorily correct a peripheral performance at the wide-angle end. When the condition of the upper limit of the inequality (3) is not satisfied, since the refractive power of the first lens unit becomes strong, it becomes difficult to correct field curvature and distortion at the wide-angle end. On the other hand, when the condition of the lower limit of the inequality (3) is not satisfied, the refractive power of the first lens unit becomes weak, so that it becomes difficult to achieve both the high zoom ratio and the miniaturization of the zoom lens.

More preferably, the inequalities (1), (2) and (3) are set as follows.

$$4.35 < ft/f1 < 5.80 \tag{1a}$$

$$1.40 < |mn/mp| < 1.98 \tag{2a}$$

$$0.025 < fw/f1 < 0.040 \tag{3a}$$

As a further aspect of the zoom lens of the present invention, when a V lens group is defined as a group of all lens units configured to move toward the image side for zooming from the wide angle end to the telephoto end included in the zoom lens, the following inequality is satisfied:

$$2.0 < (\beta vt/\beta vw)^2 \times (fw/\mathrm{ft}) < 5.0 \tag{4}$$

where βvw and βvt represent composite lateral magnifications of the V lens group at the wide angle end and the telephoto end, respectively.

The inequality (4) defines a ratio (zoom share) of the combined lateral magnifications at the wide-angle end and the telephoto end in the V lens group and a ratio of zoom shares of the other lens units at the wide-angle end and the telephoto end. By satisfying the range of the inequality (4), both the downsizing of the zoom lens and the correction of axial chromatic aberration are achieved while achieving the high zoom ratio. When the condition of the upper limit of the inequality (4) is not satisfied, the combined lateral magnification of the V lens group at the telephoto end becomes large, and the axial chromatic aberration generated in the V lens group becomes large. Therefore, it becomes difficult to satisfactorily correct the optical performance at the telephoto end, particularly axial chromatic aberration. On the other hand, when the condition of the lower limit of the inequality (4) is not satisfied, the zoom share of the V lens group becomes small, so that movement amounts of the lens units other than the V lens group become large, and it becomes difficult to achieve both the high zoom ratio and the miniaturization of the zoom lens. More preferably, the inequality (4) is set as follows.

$$2.5 < (\beta vt/\beta vw)^2 \times (fw/\mathrm{ft}) < 4.2 \tag{4a}$$

As a further aspect of the zoom lens of the present invention, when a C lens group is defined as a group of all lens units configured to move toward the object side for zooming from the wide angle end to the telephoto end included in the zoom lens and the V lens group passes through a point (state) where the combined lateral magnification is −1 during zooming from the wide-angle end to the telephoto end, the following inequality is satisfied:

$$-1.00 < \beta cfz < -0.65 \tag{5}$$

where βcfz represents a combined lateral magnification of the C-lens group at a zoom position fz where the combined lateral magnification of the V-lens group is −1.

The inequality (5) defined in order to reduce a size of the C lens group and to favorably correct the optical performance at an intermediate zoom position and the telephoto end. When the condition of the upper limit of the inequality (5) is not satisfied, since the C lens group is positioned on the object side at the zoom position fz, a lens diameter of the C lens group becomes large, and it becomes difficult to downsize the zoom lens. On the other hand, if the condition of the lower limit of the inequality (5) is not satisfied, an amount of movement of the C lens group from the zoom position fz to the telephoto end becomes large, so that it becomes difficult to satisfactorily correct the variation in spherical aberration from the intermediate zoom position to the telephoto end. More preferably, the inequality (5) is set as follows.

$$-0.9 < \beta cfz < -0.7 \tag{5a}$$

In another aspect of the zoom lens of the present invention, when the lens group moving toward the object side during zooming from the wide-angle end to the telephoto end is the C lens group, the V lens group passes through a point where the composite lateral magnification is −1 during zooming from the wide-angle end to the telephoto end, and the combined lateral magnification of the C lens group at a zoom position fz where the combined lateral magnification of the V lens group is −1 becomes −1 simultaneously.

As a further aspect of the zoom lens of the present invention, the C lens group includes in order from the object side to the image side: a P1 lens unit having a positive refractive power and a P2 lens unit having a positive refractive power. The following inequality is satisfied, $$0.1 < dt/dw < 2.0 \tag{6}$$

where dw and dt represent distances between adjacent optical surfaces on the optical axis of the P1 lens unit and the P2 lens unit at the wide-angle end and the telephoto end, respectively.

Here, the intervals dw and dt between the P1 lens unit and the P2 lens unit at the wide angle end and the telephoto end are distances on the optical axis between a surface closest to the image side of the P1 lens unit and a surface closest to the object side of the P2 lens unit at the wide angle end and the telephoto end, respectively. The inequality (6) is defined in order to achieve both downsizing of the zoom lens and correction of axial chromatic aberration while achieving a high zoom ratio. When the condition of the upper limit of the inequality (6) is not satisfied, since the interval between the P1 lens unit and the P2 lens unit at the telephoto end increases, a zoom share of the V lens unit increases. Therefore, although the sum of the amounts of movement of the V lens group and the C lens group becomes small, the lateral magnification of the N lens group at the telephoto end becomes large, and the axial chromatic aberration generated in the N lens group becomes large. On the other hand, when the condition of the lower limit of the inequality (6) is not satisfied, the interval between the P1 lens unit and the P2 lens unit at the wide-angle end becomes large, and it becomes difficult to satisfactorily correct the variation in the axial chromatic aberration from the wide-angle end to the intermediate zoom position. More preferably, the inequality (6) is set as follows.

$$0.1 < dt/dw < 1.5 \quad (6a)$$

According to another aspect of the zoom lens of the present invention, a V lens group is defined as a group of all lens units configured to move toward the image side for zooming from the wide angle end to the telephoto end included in the zoom lens, the following inequality is satisfied, $$-15.0 < fl/fvw < -8.0 \quad (7)$$

where fvw represents a combined focal length of the V lens group at the wide angle end.

Inequality (7) is defined in order to achieve both downsizing of the zoom lens and aberration correction over the entire zoom range. When the condition of the upper limit of inequality (7) is not satisfied, the refractive power of the V lens group becomes weak, and thus it becomes difficult to reduce the size of the zoom lens. On the other hand, when the condition of the lower limit of the inequality (7) is not satisfied, the refractive power of the V lens group becomes strong, so that it becomes difficult to satisfactorily correct aberrations particularly from the intermediate zoom position to the telephoto end. More preferably, the inequality (7) is set as follows.

$$-13.0 < fl/fvw < -9.5 \quad (7a)$$

According to another aspect of the zoom lens of the present invention, a V lens group is defined as a group of all lens units configured to move toward the image side for zooming from the wide angle end to the telephoto end included in the zoom lens and a C lens group is defined as a group of all lens units configured to move toward the object side for zooming from the wide angle end to the telephoto end included in the zoom lens, the following inequality is satisfied, $$-0.50 < fvw/fcw < -0.15 \quad (8)$$

where fvw and fcw represent combined focal lengths of the V lens group and the C lens group at the wide angle end, respectively.

Inequality (8) is defined in order to achieve both downsizing of the zoom lens and aberration correction over the entire zoom range. When the condition of the upper limit of the inequality (8) is not satisfied, since the refractive power of the C lens group becomes weak, the movement amount of the C lens group becomes large, and it becomes difficult to downsize the zoom lens. On the other hand, when the condition of the lower limit of the inequality (8) is not satisfied, the refractive power of the C lens group becomes strong, so that it becomes difficult to favorably correct aberrations in the intermediate zoom position. More preferably, the inequality (8) is set as follows.

$$-0.4 < fvw/fcw < 0.2 \quad (8a)$$

In a further aspect of the zoom lens of the present invention, a lens closest to the object side in the first lens unit is a biconcave lens. By disposing the biconcave lens closest to the object side in the first lens unit, it is possible to position an image-side principal point of the first lens unit in the image side. Therefore, an increase in the lens diameter of the first lens subunit due to widening of the angle of view is suppressed, which is advantageous for downsizing of the zoom lens.

According to a further aspect of the zoom lens of the present invention, the following inequality is satisfied, $$-1.65 < fln/fl > -1.10 \quad (9)$$

$$37 < vln < 48 \quad (10)$$

where f1n represents a focal length of a lens closest to the object side in the first lens unit and v1n represents an Abbe number with respect to d-line.

Inequality (9) defines a ratio of the focal length of a 1n lens which is the lens closest to the object side in the first lens unit and the focal length of the first lens unit. Inequality (10) defines the Abbe number of the 1n lens which is the lens closest to the object side in the first lens subunit. The inequalities (9) and (10) are defined in order to satisfactorily correct chromatic aberration at the telephoto end while achieving a wide angle of view, a high zoom ratio, and downsizing of the zoom lens. When the upper limit of the inequality (9) is not satisfied, the refractive power of the 1n lens becomes strong with respect to the refractive power of the first lens unit, so that high-order spherical aberrations at the telephoto end increase, and it becomes difficult to achieve good optical performances. On the other hand, when the condition of the lower limit of the inequality (9) is not satisfied, the refractive power of the 1n lens becomes weak with respect to the refractive power of the first lens unit, so that it becomes difficult to downsize the zoom lens. Further, when the refractive power of the 1n lens is weak, the effect of correcting chromatic aberration generated in a positive lens constituting the first lens unit becomes weak, and the correction of chromatic aberration at the telephoto end becomes insufficient. When the upper limit of the inequality (10) is not satisfied, a difference in Abbe number between the positive lens and the negative lens constituting the first lens unit becomes small, and the refractive power of each lens constituting the first lens unit becomes strong. As a result, high-order spherical aberration at the telephoto end increases, and it becomes difficult to achieve good optical performance. On the other hand, when the condition of the lower limit of the inequality (10) is not satisfied, the difference between the Abbe numbers of the positive lens and the negative lens constituting the first lens unit becomes large, and the refractive power of the 1n lens becomes weak. Therefore, the effect of correcting the chromatic aberration generated in the positive lens constituting the first lens unit becomes weak, and the correction of the chromatic aberration at the telephoto end becomes insufficient. More preferably, the inequality (9) is set as follows.

$$-1.63 < f1n/f1 < -1.15 \tag{9a}$$

As a further aspect of the zoom lens of the present invention, the following inequality is satisfied, $$80 < \nu pave < 100 \tag{11}$$

where νpave represents an average Abbe number with respect to d-line of a positive lens constituting the first lens unit.

The condition of the inequality (11) is defined in order to achieve correction of axial chromatic aberration and high optical performance at the telephoto end. When the upper limit of the inequality (11) is not satisfied, it is difficult to manufacture a low-dispersion glass material. On the other hand, when the condition of the lower limit of the inequality (11) is not satisfied, the difference in Abbe number between the positive lens and the negative lens constituting the first lens unit becomes small, and the refractive power of each lenses constituting the first lens unit becomes strong. As a result, high-order spherical aberration at the telephoto end increases, and it becomes difficult to achieve good optical performance. More preferably, the inequality (11) is set as follows.

$$87 < \nu pave < 97 \tag{11a}$$

As another aspect of the zoom lens of the present invention, the following inequality is satisfied, $$125 < ft/fw < 200 \tag{12}$$

where fw represents the focal length at the wide-angle end and ft represents the focal length at the telephoto end.

Further, the image pickup apparatus according to the present invention includes the zoom lens according to any one of the embodiments and a solid-state image pickup element having a predetermined effective image pickup range for receiving an image formed by the zoom lens.

A protection filter and a lens corresponding to the protection filter may be mounted adjacent to the object side of the zoom lens of the present invention, that is, on the object side of the first lens unit, to protect a foremost optical surface of the zoom lens of the present invention. Note that a biconcave lens is disposed closest to the object side in the first lens unit so that the image-side principal point of the first lens unit is positioned in the image side of the first lens unit, and an increase in the lens diameter of the first lens subunit due to the widening of the angle of view is suppressed to realize a reduction in size of the zoom lens. To obtain the effect, the following inequality is satisfied, $$|f1/f1n| > 0.05 \tag{13}$$

where f1 represents the focal length of the first lens unit and f1n represents the focal length of the 1n lens closest to the object side in the first lens unit.

When the inequality (13) is evaluated assuming that the protective filter and the lens corresponding to the protective filter mounted adjacent to the object side of the zoom lens are included in the first lens unit, if the inequality (13) is not satisfied, the mounted object is not included as a member of the first lens group, that is, is not included as a member of the zoom lens of the present invention.

Hereinafter, specific configurations of the zoom lens according to the present invention will be described from characteristics of lens configurations of Numerical Embodiments 1 to 7 corresponding to Embodiments 1 to 7.

Embodiment 1

Figures 2A, 2B, 2C:
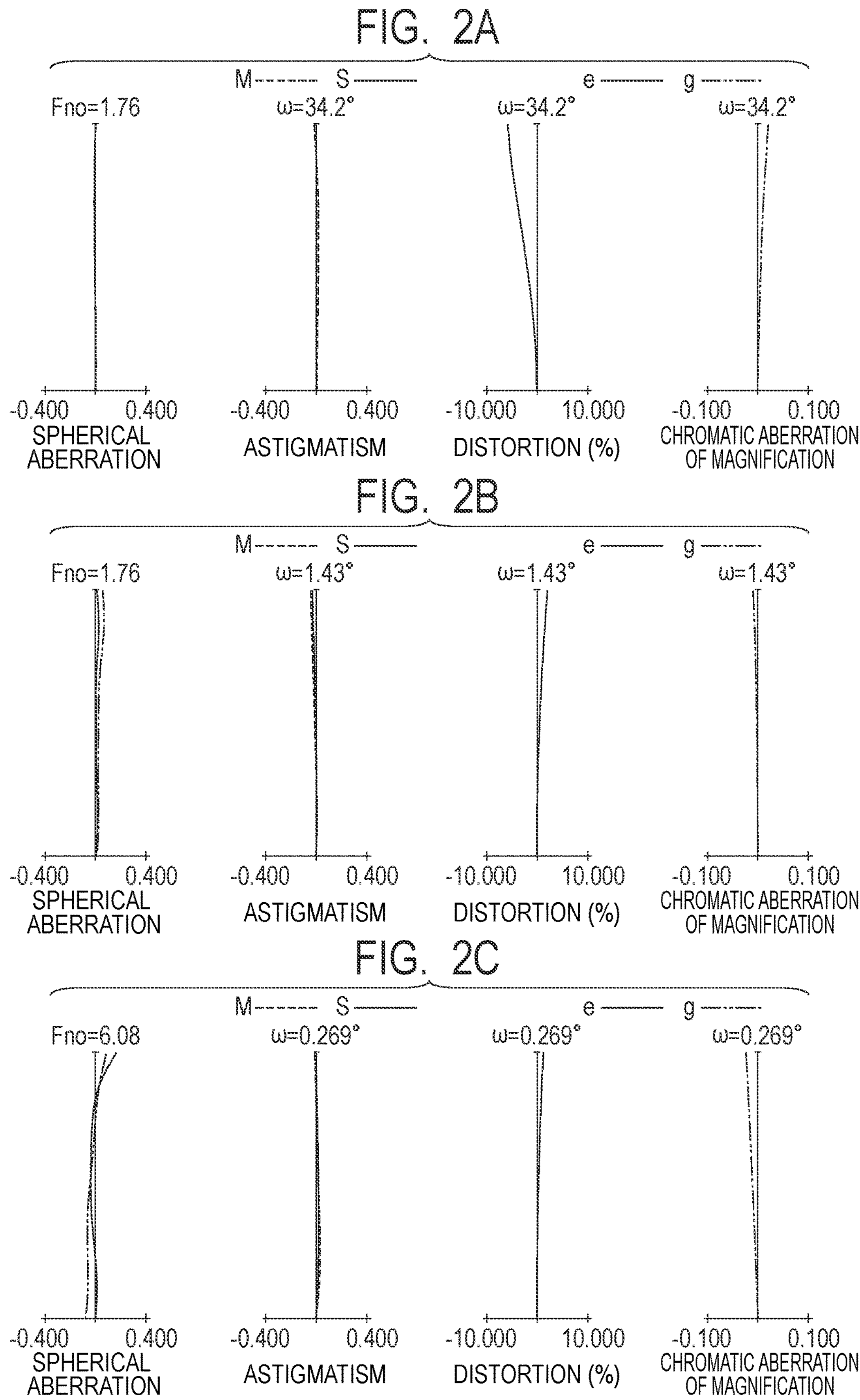
FIG. 2A is an aberration diagram when focusing on the object at infinity at the wide angle end according to Numerical Embodiment 1.
FIG. 2B is an aberration diagram when focusing on the object at infinity with f=220.03 mm according to Numerical Embodiment 1.
FIG. 2C is an aberration diagram when focusing on the object at infinity at the telephoto end according to Numerical Embodiment 1.

FIG. 1 shows a cross-sectional view of a zoom lens according to Embodiment 1 (Numerical Embodiment 1) of the present invention when the zoom lens is focused on an object at infinity at the wide-angle end. FIGS. 2A to 2C show longitudinal aberration diagrams of Numerical Embodiment 1 at the wide-angle end (FIG. 2A), at focal length 220.03 mm (FIG. 2B), and at the telephoto end (FIG. 2C), respectively. Each aberration diagram is a longitudinal aberration diagram when focusing on an object at infinity. In addition, the value of the focal length is a value when the numerical embodiments described later are expressed in units of mm. This also applies to all of the following numerical embodiments.

In FIG. 1, the zoom lens of the present invention includes, in order from the object side to the image side, a first lens unit L1 having a positive refractive power for focusing. The zoom lens further includes a second lens unit L2 having a negative refractive power that is configured to move toward the image side for zooming from the wide angle end to the telephoto end and a third lens unit L3 having a positive refractive power that is configured to move toward the object side for zooming from the wide angle end to the telephoto end. The zoom lens further includes a fourth lens unit L4 having a positive refractive power that is configured to move non-linearly on the optical axis in conjunction with the movements of the second lens unit L2 and the third lens unit L3 to correct an image plane variation caused by zooming. The zoom lens further includes a fifth lens unit L5 which is configured not to move for zooming and has an imaging effect. In this embodiment, the N lens unit corresponds to the second lens unit L2, the P lens unit corresponds to the fourth lens unit L4, the V lens group corresponds to the second lens unit L2, and the C lens group corresponds to the third lens unit L3 and the fourth lens unit L4. Note that the focal length 220.03 mm is a zoom position at which the combined lateral magnification of the V lens group is −1.

In this embodiment, the second lens unit L2, the third lens unit L3, and the fourth lens unit L4 constitute a zooming optical system. An aperture diaphragm SP is disposed between the fourth lens unit L4 and the fifth lens unit L5. Further, the aperture stop is not configured to move in the optical axis direction for zooming. A glass block P represents a color separation prism or an optical filter. An image plane I corresponds to an image pickup surface of a solid-state image pickup element (photoelectric conversion element) or the like that receives and photoelectrically converts an image formed by the zoom lens when the zoom lens is used as an image pickup optical system of a broadcasting television camera, a video camera, or a digital still camera. When the zoom lens is used as an imaging optical system of a film camera, the image plane I corresponds to a film surface to which an image formed by the zoom lens is exposed.

In the longitudinal aberration diagram, the solid line and the two dot chain line in the spherical aberration diagram indicate e-line and g-line, respectively. The dotted line and the solid line in the astigmatism diagram indicate the meridional image plane and the sagittal image plane, respectively. The two dot chain line, the one dot chain line, and the dotted line in the chromatic aberration of magnification diagram indicate g-line, C-line, and F-line, respectively. ω denotes a half angle of view, and Fno denotes an F-number. In the longitudinal aberration diagram, spherical aberration is drawn with a scale of 0.4 mm, astigmatism is drawn with a scale of 0.4 mm, distortion is drawn with a scale of 10%, and chromatic aberration of magnification is drawn with a scale of 0.1 mm. In the following embodiments, the wide-angle end and the telephoto end refer to zoom positions when the second lens unit L2 configured to move for zooming is positioned at both ends of a movable range on the optical axis with respect to the mechanism.

The first lens unit L1 corresponds to a first surface to a twelfth surface. The second lens unit L2 corresponds to a thirteenth surface to a nineteenth surface, the third lens unit L3 corresponds to a twentieth surface to a twenty fifth surface, and the fourth lens unit L4 corresponds to a twenty sixth surface to a thirtieth surface. The fifth lens unit L5 corresponds to a thirty first surface to a fifty third surface. The first lens unit L1 includes a first lens subunit L11 that is not configured to move for focusing, and a second lens subunit L12 having a positive refractive power that is configured to move for focusing from the infinity side to the close side. The first lens subunit L11 corresponds to the first surface to the sixth surface, and the second lens subunit L12 corresponds to the seventh surface to the twelfth surface. The first lens unit L1 includes six lenses, that is, a biconcave lens, a biconvex lens, a biconvex lens, a biconvex lens, a meniscus-convex lens having a concave surface on the image side, and a meniscus-convex lens having a concave surface on the image side in order from the object side.

A first numerical embodiment corresponding to the first embodiment will be described. Not only in numerical embodiment 1 but also in all numerical embodiments i denotes an order of surfaces (optical surfaces) from the object side, ri denotes a radius of curvature of the i-th surface from the object side, and di denotes an interval (on the optical axis) between the i-th surface and the (i+1)-th surface from the object side. Further, ndi, νdi, and θgFi represent a refractive index, an Abbe number, and a partial dispersion ratio of a medium (optical member) between the i-th surface and the (i+1)-th surface, and BF represents an back focus in air. An aspherical shape is expressed by the following equation, where X-axis is in the optical axis direction, H-axis is in the direction perpendicular to the optical axis, the traveling direction of light is positive, R is a paraxial curvature radius, k is a conic constant, and A3 to A16 are aspherical coefficients. Further, "e-Z" means "$\times 10^{-Z}$".

[Expression 1]

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16} + A3H^3 + A5H^5 + A7H^7 + A9H^9 + A11H^{11} + A13H^{13} + A15H^{15}$$

Table 1 shows values corresponding to the inequalities in this embodiment. In Table 1, the signs of mn and mp, which are the differences between the positions of the N lens unit and the P lens unit from the image plane on the optical axis at the wide-angle end and the telephoto end, are shown as positive for changing toward the image side and negative for changing toward the object side during zooming from the wide-angle end to the telephoto end. This embodiment satisfies inequalities (1) to (13), and achieves a zoom lens having a wide angle of view, a high zoom ratio, a small size and a light weight, and high optical performance over the entire zoom range by appropriately setting the refractive power of the first lens unit and the amounts of movement of the lens units that move for zooming. It is essential for the zoom lens of the present invention to satisfy the inequalities (1) to (3), but the inequalities (4) to (13) may not be satisfied. However, if at least one of the inequalities (4) to (13) is satisfied, a better effect can be obtained. This also applies to the other embodiments.

Figure 15:
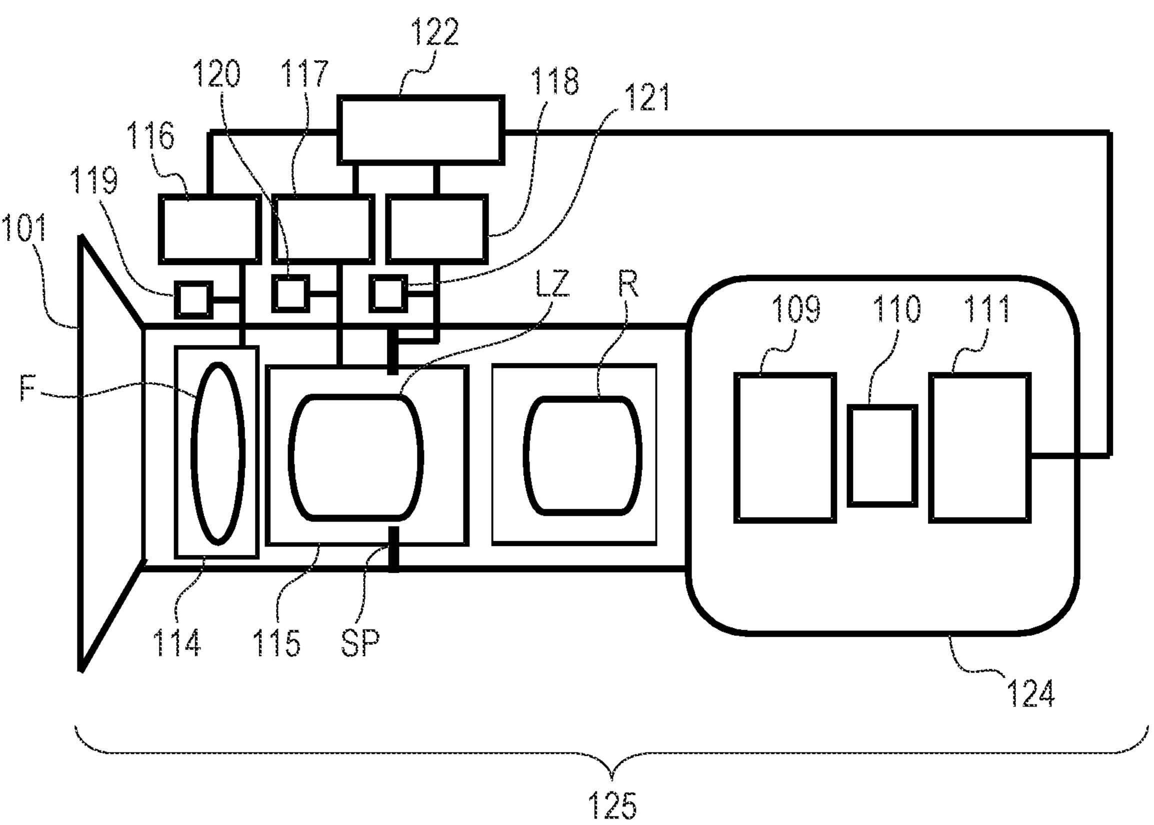
FIG. 15 is a schematic view of an image pickup apparatus according to the present invention.

FIG. 15 is a schematic diagram of an image pickup apparatus (television camera system) using the zoom lens of each embodiment as an image pickup optical system. In FIG. 15, reference numeral 101 denotes a zoom lens according to any one of embodiments 1 to 7. Reference numeral 124 denotes a camera. The zoom lens 101 is attachable to and detachable from the camera 124. Reference numeral 125 denotes an image pickup apparatus configured by attaching the zoom lens 101 to the camera 124. The zoom lens 101 includes a first lens unit F, a zoom lens unit LZ, and a rear lens unit R for imaging. The first lens unit F includes a lens unit configured to move for focusing. The zoom lens unit LZ includes a second lens unit and a third lens unit that are configured to move on the optical axis for zooming, and a fourth lens unit that is configured to move on the optical axis to correct an image plane variation caused by zooming. Reference numerals 114 and 115 denote driving mechanisms such as helicoids and cams that drive the first lens unit F and the zoom lens unit LZ in the optical axis direction. Reference numerals 116 to 118 denote motors (driving units) that electrically drive the driving mechanisms 114 and 115 and the aperture stop SP. Reference numerals 119 to 121 denote detectors such as encoders, potentiometers, or photosensors that detect positions of the first lens unit F and the zoom lens unit LZ on the optical axis, and an aperture diameter of the aperture stop SP. In the camera 124, reference numeral 109 denotes a glass block corresponding to an optical filter or a color separation optical system in the camera 124; and reference numeral 110 denotes a solid-state image pickup element (photoelectric conversion element) such as a CCD sensor or a CMOS sensor that receives a subject image formed by the zoom lens 101. Reference numerals 111 and 122 denote CPUs that control various drives of the camera 124 and the zoom lens 101.

As described above, by applying the zoom lens of the present invention to a television camera, an image pickup apparatus having a high optical performance is realized.

Embodiment 2

Figure 3:
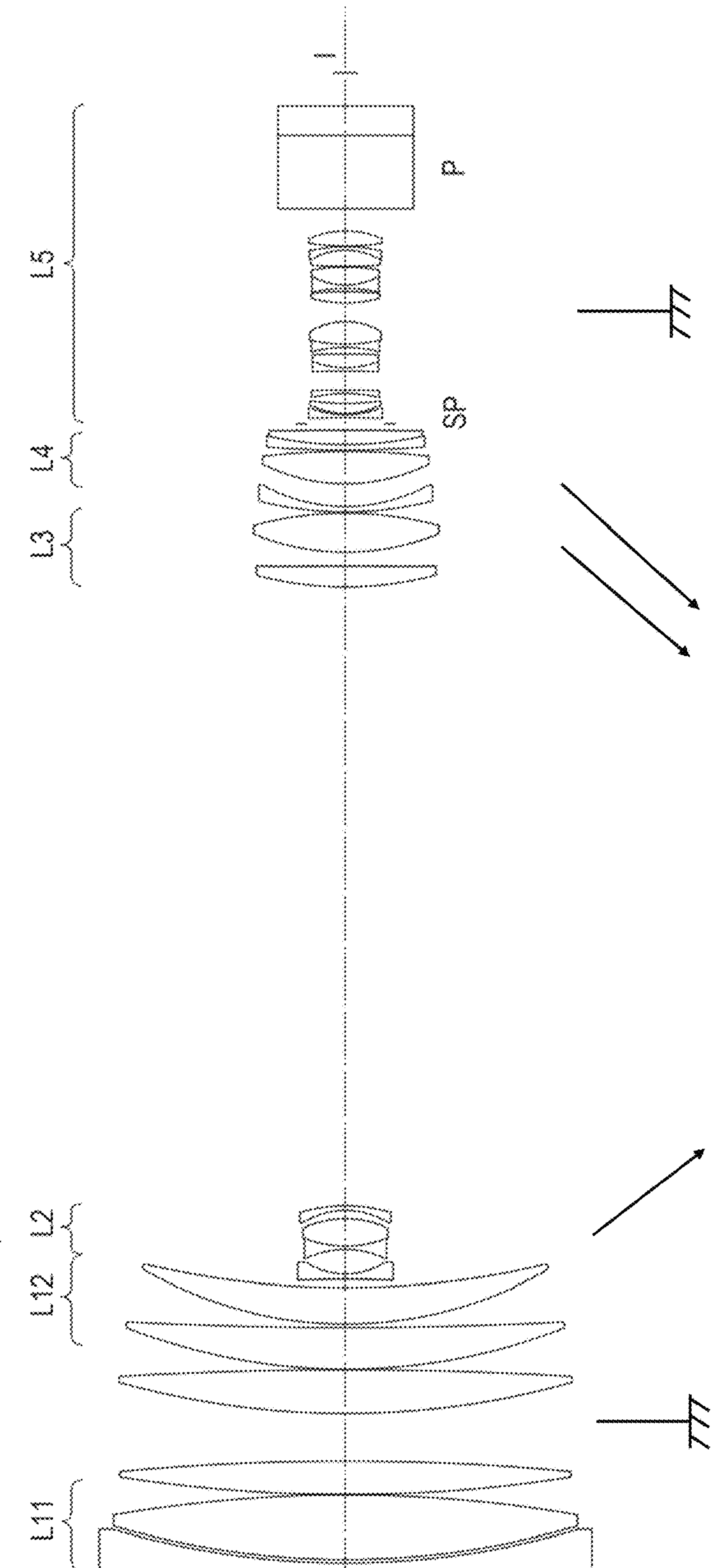
FIG. 3 is a lens sectional view when focusing on the object at infinity at the wide angle end according to Numerical Embodiment 2.
Figures 4A, 4B, 4C:
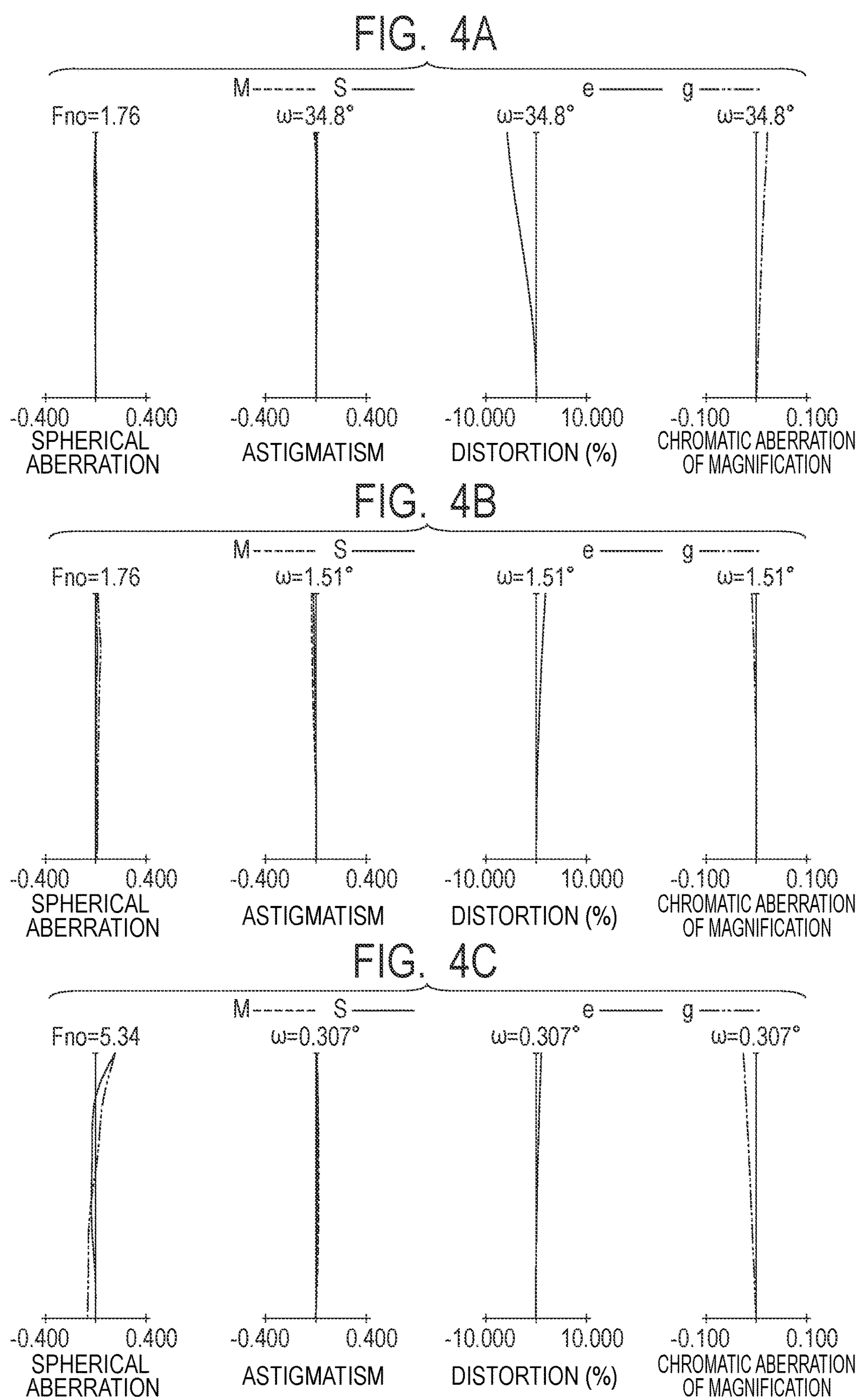
FIG. 4A is an aberration diagram when focusing on the object at infinity at the wide angle end according to Numerical Embodiment 2.
FIG. 4B is an aberration diagram when focusing on the object at infinity at f=208.08 mm according to Numerical Embodiment 2.
FIG. 4C is an aberration diagram when focusing on the object at infinity at the telephoto end according to Numerical Embodiment 2.

FIG. 3 is a lens sectional view of the zoom lens according to Embodiment 2 (Numerical Embodiment 2) of the present invention when the zoom lens is focused on an object at infinity at the wide-angle end. In FIGS. 4A to 4C, FIG. 4A is a longitudinal aberration diagram at the wide-angle end of Numerical Embodiment 2, FIG. 4B is a longitudinal aberration diagram at the focal length 208.08 mm of Numerical Embodiment 2, and FIG. 4C is a longitudinal aberration diagram at the telephoto end of Numerical Embodiment 2. Each aberration diagram is a longitudinal aberration diagram when focusing on an object at infinity.

In FIG. 3, the zoom lens includes in order from the object side, a first lens unit L1 having a positive refractive power that is configured to move for focusing. The zoom lens further includes a second lens unit L2 having a negative refractive power that is configured to move toward the image side for zooming from the wide angle end to the telephoto end and a third lens unit L3 having a positive refractive power that is configured to move toward the object side for zooming from the wide angle end to the telephoto end. The zoom lens further includes a fourth lens unit L4 having a positive refractive power that is configured to move non-linearly on the optical axis in conjunction with the movement of the second lens unit L2 and the third lens unit L3 to correct image plane variation caused by zooming. The zoom lens further includes a fifth lens unit L5 which does not move for zooming and has an imaging effect. In this embodiment, the N lens unit corresponds to the second lens unit L2, the P lens unit corresponds to the fourth lens unit L4, the V lens group corresponds to the second lens unit L2, and the C lens group corresponds to the third lens unit L3 and the fourth lens unit L4. Note that focal length 208.08 mm is a zoom position at which the combined lateral magnification of the V lens group is −1.

In this embodiment, the second lens unit L2, the third lens unit L3, and the fourth lens unit L4 constitute a zooming optical system. An aperture stop SP is disposed between the fourth lens unit L4 and the fifth lens unit L5. The aperture stop SP does not move in the optical axis direction for zooming.

The first lens unit L1 corresponds to a first surface to a twelfth surface. The second lens unit L2 corresponds to a thirteenth surface to a nineteenth surface, the third lens unit L3 corresponds to a twentieth surface to a twenty fifth surface, and the fourth lens unit L4 corresponds to a twenty sixth surface to a thirtieth surface. The fifth lens unit L5 corresponds to a thirty first surface to a fifty third surface. The first lens unit L1 includes a first lens subunit L11 that is configured not to move for focusing, and a second lens subunit L12 having a positive refractive power that is configured to move for focusing from the infinity side to the close side. The first lens subunit L11 corresponds to the first surface to the sixth surface, and the second lens subunit L12 corresponds to the seventh surface to the twelfth surface. The first lens unit L1 includes six lenses, that is, a biconcave lens, a biconvex lens, a biconvex lens, a biconvex lens, a meniscus-convex lens having a concave surface on the image side, and a meniscus-convex lens having a concave surface on the image side in order from the object side.

Table 1 shows values corresponding to the inequalities in this embodiment. This embodiment satisfies inequalities (1) to (13), and achieves a zoom lens having a wide angle of view, a high zoom ratio, a small size and a light weight, and high optical performance over the entire zoom range by appropriately setting the refractive power of the first lens unit and the amounts of movement of the lens units that move for zooming.

Embodiment 3

Figure 5:
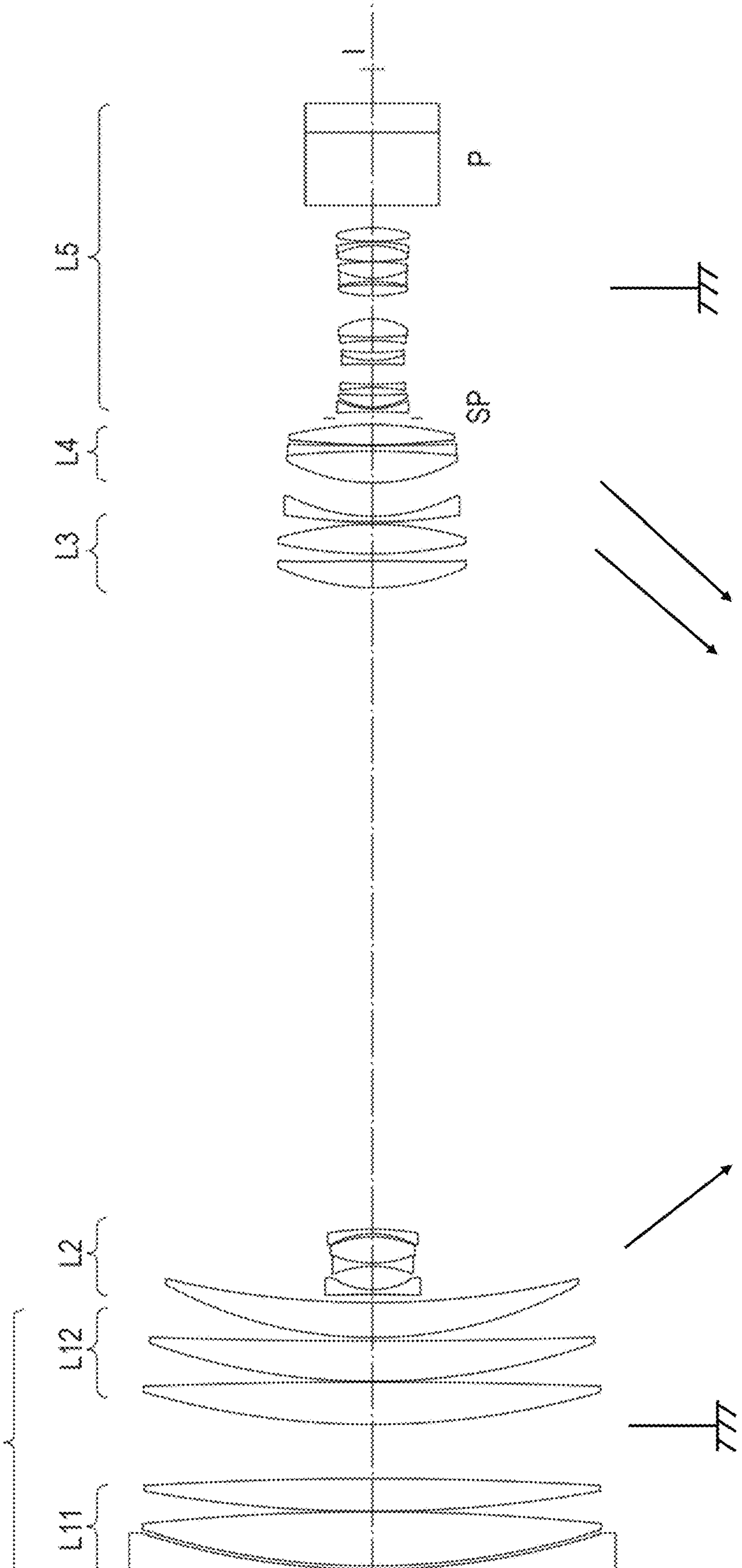
FIG. 5 is a lens sectional view when focusing on the object at infinity at the wide angle end according to Numerical Embodiment 3.
Figures 6A, 6B, 6C:
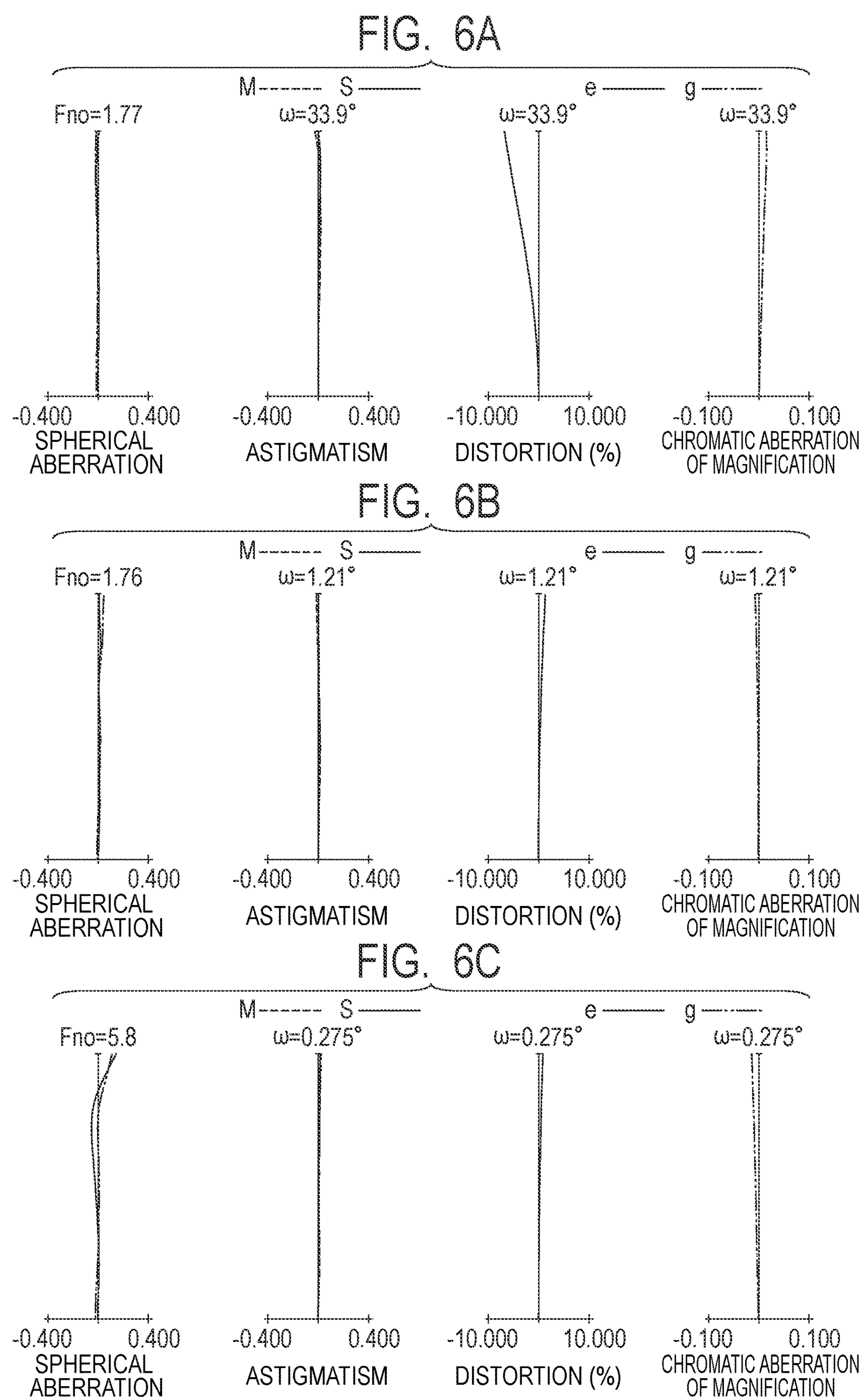
FIG. 6A is an aberration diagram when focusing on the object at infinity at the wide angle end according to Numerical Embodiment 3.
FIG. 6B is an aberration diagram when focusing on the object at infinity at f=260.97 mm according to Numerical Embodiment 3.
FIG. 6C is an aberration diagram when focusing on the object at infinity at the telephoto end according to Numerical Embodiment 3.

FIG. 5 is a lens sectional view of a zoom lens according to Embodiment 3 (Numerical Embodiment 3) of the present invention when the zoom lens is focused on an object at infinity at the wide angle end. In FIGS. 6A to 6C, FIG. 6A is a longitudinal aberration diagram at the wide-angle end of Numerical Embodiment 3, FIG. 6B is a longitudinal aberration diagram at the focal length 260.97 mm of Numerical Embodiment 3, and FIG. 6C is a longitudinal aberration diagram at the telephoto end of Numerical Embodiment 3. Each aberration diagram is a longitudinal aberration diagram when focusing on an object at infinity.

In FIG. 5, the zoom lens includes in order from the object side, a first lens unit L1 having a positive refractive power that is configured to move for focusing. The zoom lens further includes a second lens unit L2 having a negative refractive power that is configured to move toward the image side for zooming from the wide angle end to the telephoto end and a third lens unit L3 having a positive refractive power that is configured to move toward the object side for zooming from the wide angle end to the telephoto end. The zoom lens further includes a fourth lens unit L4 having a positive refractive power that is configured to move non-linearly on the optical axis in conjunction with the movement of the second lens unit L2 and the third lens unit L3 to correct an image plane variation caused by zooming. The zoom lens further includes a fifth lens unit L5 which does not move for zooming and has an imaging effect. In this embodiment, the N lens unit corresponds to the second lens unit L2, the P lens unit corresponds to the fourth lens unit L4, the V lens group corresponds to the second lens unit L2, and the C lens unit corresponds to the third lens unit L3 and the fourth lens unit L4. Note that focal length 260.97 mm is a zoom position at which the combined lateral magnification of the V lens group is −1.

In this embodiment, the second lens unit L2, the third lens unit L3, and the fourth lens unit L4 constitute a zooming optical system. An aperture stop SP is disposed between the fourth lens unit L4 and the fifth lens unit L5. The aperture stop SP does not move in the optical axis direction for zooming.

The first lens unit L1 corresponds to a first surface to a twelfth surface. The second lens unit L2 corresponds to a thirteenth surface to a nineteenth surface, the third lens unit L3 corresponds to a twentieth surface to a twenty fifth surface, and the fourth lens unit L4 corresponds to a twenty sixth surface to a thirtieth surface. The fifth lens unit L5 corresponds to a thirty first surface to a fifty third surface. The first lens unit L1 includes a first lens subunit L11 that is configured not to move for focusing, and a second lens subunit L12 having a positive refractive power that is configured to move for focusing from the infinity side to the close side. The first lens subunit L11 corresponds to the first surface to the sixth surface, and the second lens subunit L12 corresponds to the seventh surface to the twelfth surface. The first lens unit L1 includes six lenses, that is, a biconcave lens, a biconvex lens, a biconvex lens, a biconvex lens, a meniscus-convex lens having a concave surface on the image side, and a meniscus-convex lens having a concave surface on the image side in order from the object side.

Table 1 shows values corresponding to the inequalities in this embodiment. This embodiment satisfies inequalities (1) to (13), and achieves a zoom lens having a wide angle of view, a high zoom ratio, a small size and a light weight, and high optical performance over the entire zoom range by appropriately setting the refractive power of the first lens unit and the amounts of movement of the lens units that move for zooming.

Embodiment 4

Figure 7:
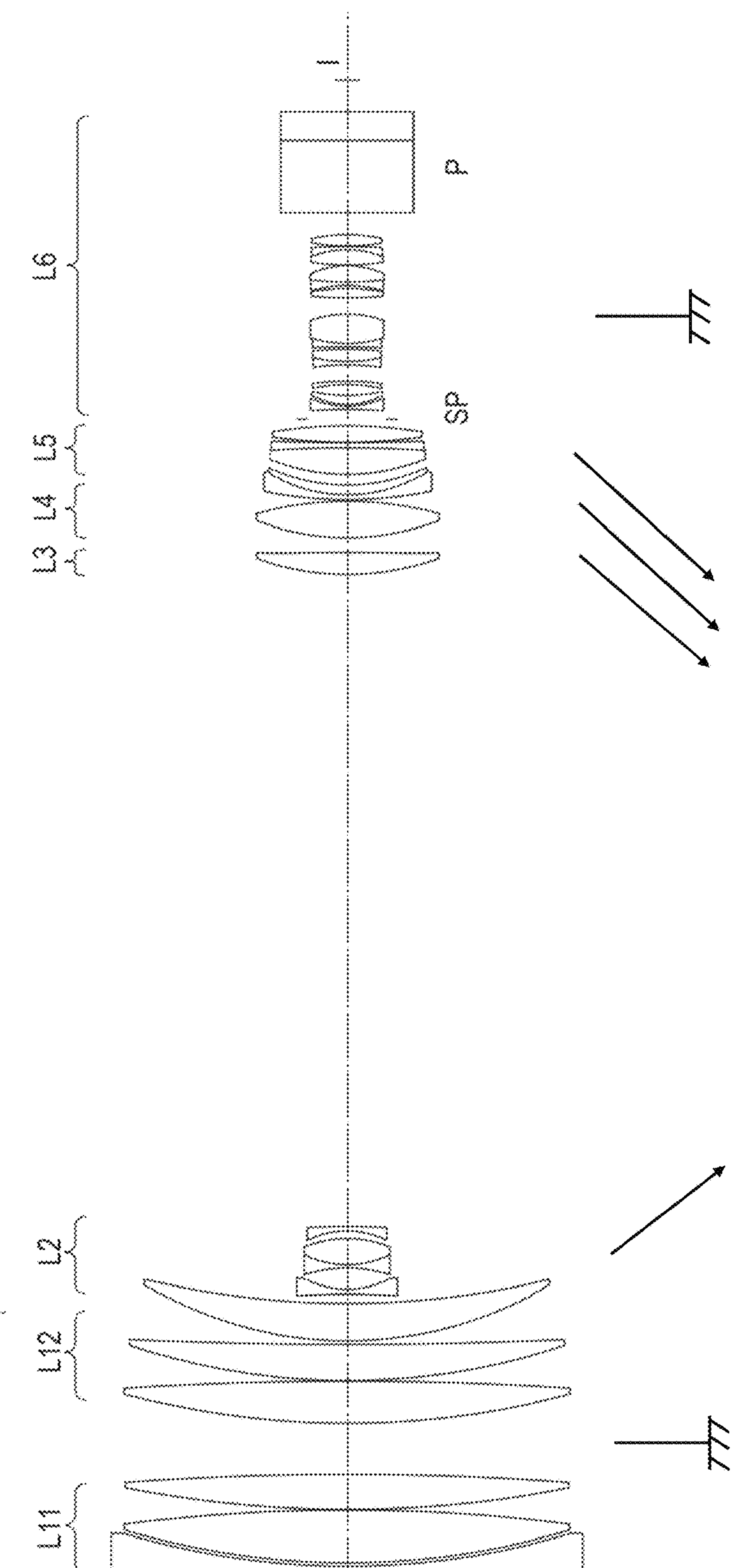
FIG. 7 is a lens sectional view when focusing on the object at infinity at the wide angle end according to Numerical Embodiment 4.
Figures 8A, 8B, 8C:
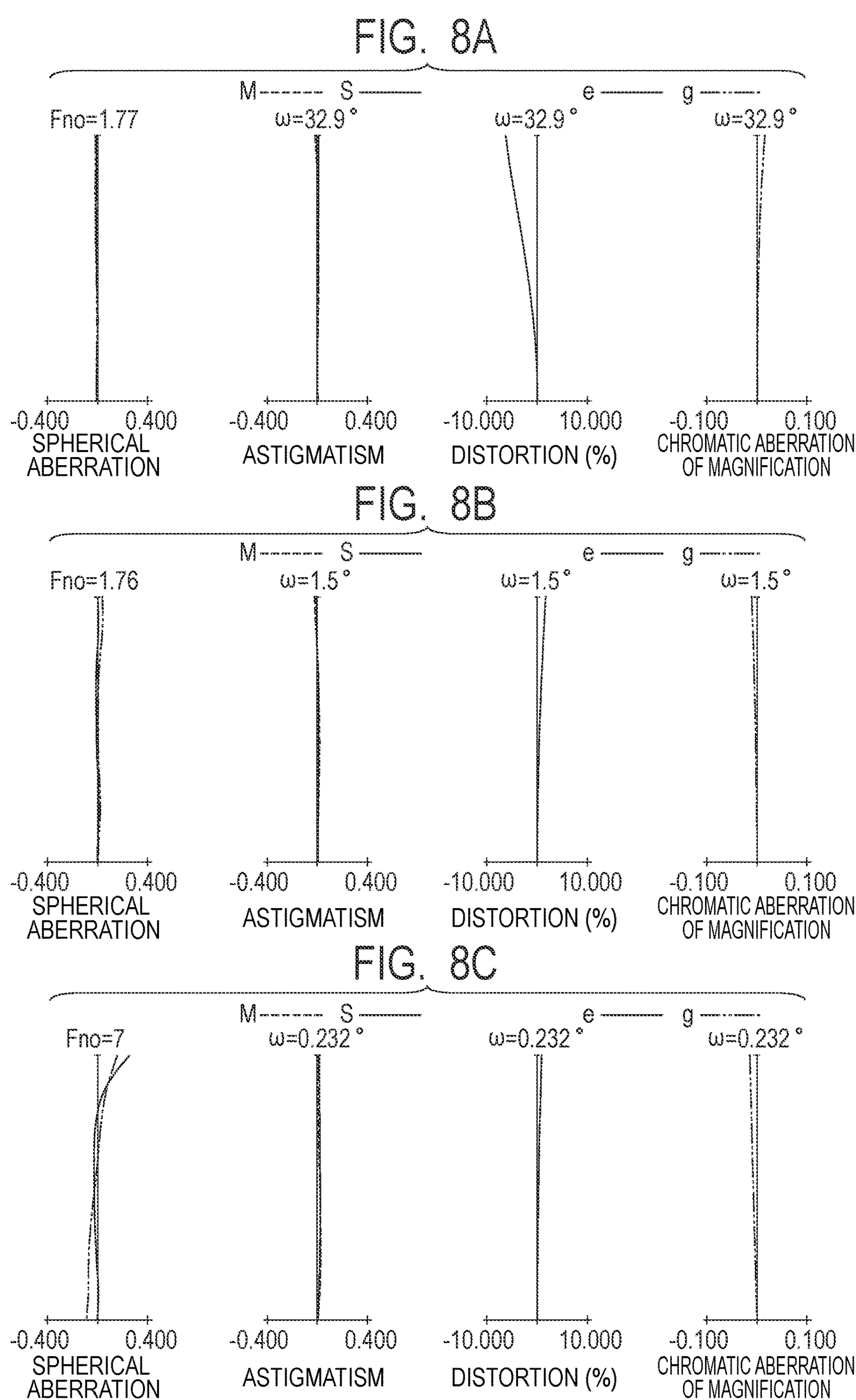
FIG. 8A is an aberration diagram when focusing on the object at infinity at the wide angle end according to Numerical Embodiment 4.
FIG. 8B is an aberration diagram when focusing on the object at infinity at f=210.60 mm according to Numerical Embodiment 4.
FIG. 8C is an aberration diagram when focusing on the object at infinity at the telephoto end according to Numerical Embodiment 4.

FIG. 7 is a lens cross-sectional view of a zoom lens according to Embodiment 4 (Numerical Embodiment 4) of the present invention when the zoom lens is focused on an object at infinity at the wide angle end. In FIGS. 8A to 8C, FIG. 8A is a longitudinal aberration diagram at the wide-angle end of Numerical Embodiment 4, FIG. 8B is a longitudinal aberration diagram at focal length 210.60 mm of Numerical Embodiment 4, and FIG. 8C is a longitudinal aberration diagram at the telephoto end of Numerical Embodiment 4. Each aberration diagram is a longitudinal aberration diagram when focusing on an object at infinity.

In FIG. 7, the zoom lens includes in order from the object side, a first lens unit L1 having a positive refractive power configured to move for focusing. The zoom lens includes a second lens unit L2 having a negative refractive power that is configured to move toward the image side, a third lens unit L3 and a fourth lens unit L4 both having positive refractive powers that are configured to move toward the object side, for zooming from the wide-angle end to the telephoto end. The zoom lens further includes a fifth lens unit L5 having a positive refractive power that is configured to move non-linearly on the optical axis in conjunction with the movement of the second lens unit L3, the third lens unit L4, and the fourth lens unit L5 to correct image plane variation caused by zooming. The zoom lens further includes a sixth lens unit L6 which does not move for zooming and has an imaging effect. In this embodiment, the N lens unit corresponds to the second lens unit L2, the P lens unit corresponds to the fifth lens unit L5, the V lens group corresponds to the second lens unit L2, and the C lens group corresponds to the third lens unit L3, the fourth lens unit L4, and the fifth lens unit L5. Note that focal length 210.60 mm is a zoom position at which the combined lateral magnification of the V lens group is −1.

In this embodiment, the second lens unit L2, the third lens unit L3, the fourth lens unit L4, and the fifth lens unit L5 constitute a zooming optical system. An aperture stop SP is disposed between the fifth lens unit L5 and the sixth lens unit L6. The aperture stop SP does not move in the optical axis direction for zooming.

The first lens unit L1 corresponds to a first surface to a twelfth surface. The second lens unit L2 corresponds to a thirteenth surface to a nineteenth surface, the third lens unit L3 corresponds to a twentieth surface to a twenty first surface, and the fourth lens unit L4 corresponds to a twenty second surface to a twenty sixth surface. The fifth lens unit L5 corresponds to a twenty seventh surface to a thirty first surface, and the sixth lens unit L6 corresponds to a thirty second surface to a fifty fourth surface. The first lens unit L1 includes a first lens subunit L11 that is configured not to move for focusing, and a second lens subunit L12 having a positive refractive power that is configured to move for focusing from the infinity side to the close side. The first lens subunit L11 corresponds to the first surface to the sixth surface, and the second lens subunit L12 corresponds to the seventh surface to the twelfth surface. The first lens unit L1 includes six lenses, that is, a biconcave lens, a biconvex lens, a biconvex lens, a biconvex lens, a meniscus-convex lens having a concave surface on the image side, and a meniscus-convex lens having a concave surface on the image side in order from the object side.

Table 1 shows values corresponding to the inequalities in this embodiment. The present embodiment satisfies inequalities (1) to (5) and (7) to (13), and achieves a zoom lens having a wide angle of view, a high zoom ratio, a small size and a light weight, and high optical performance over the entire zoom range by appropriately setting the refractive power of the first lens and the amounts of movement of the lens units that move for zooming.

Embodiment 5

Figure 9:
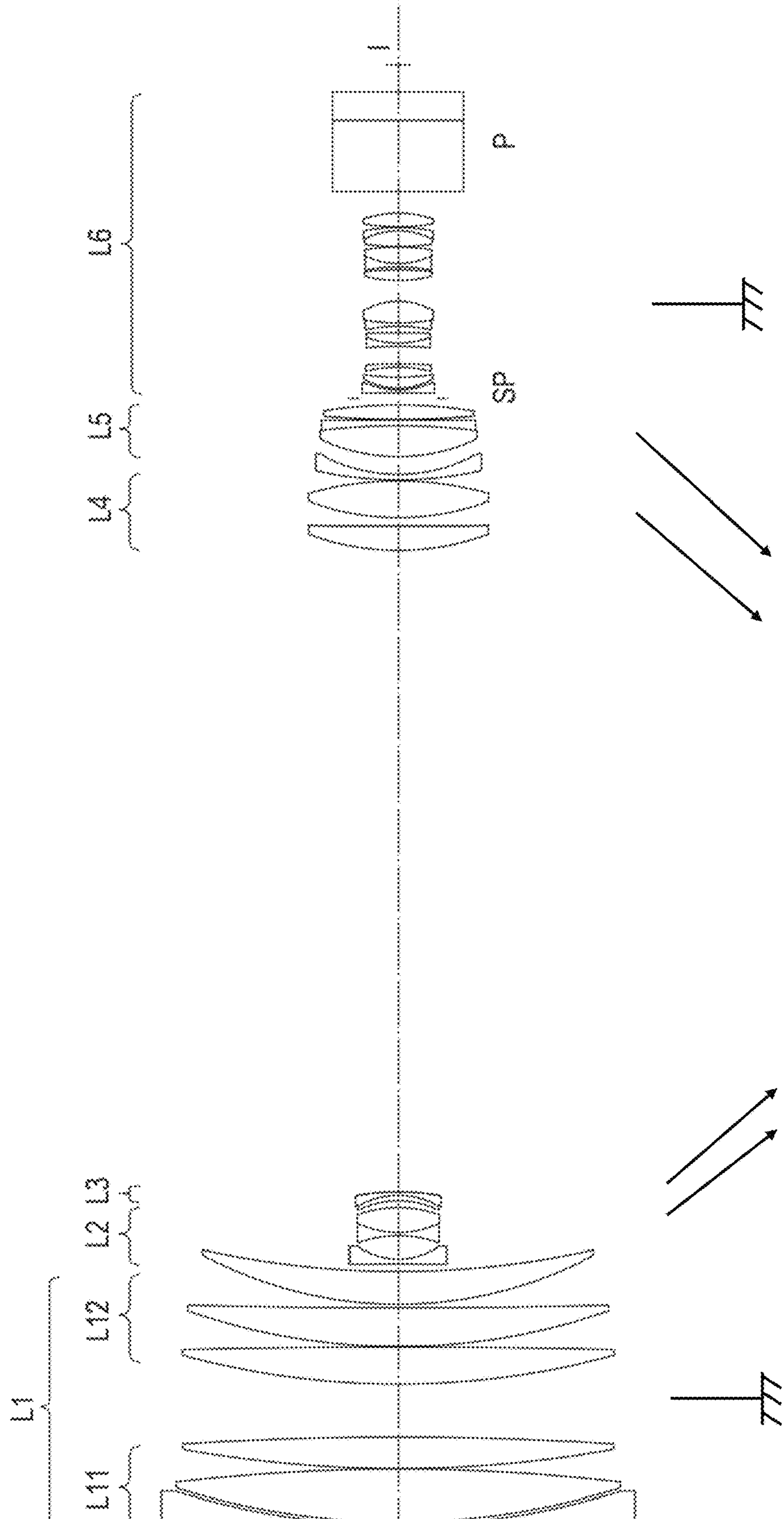
FIG. 9 is a lens sectional view when focusing on the object at infinity at the wide angle end according to Numerical Embodiment 5.
Figures 10A, 10B, 10C:
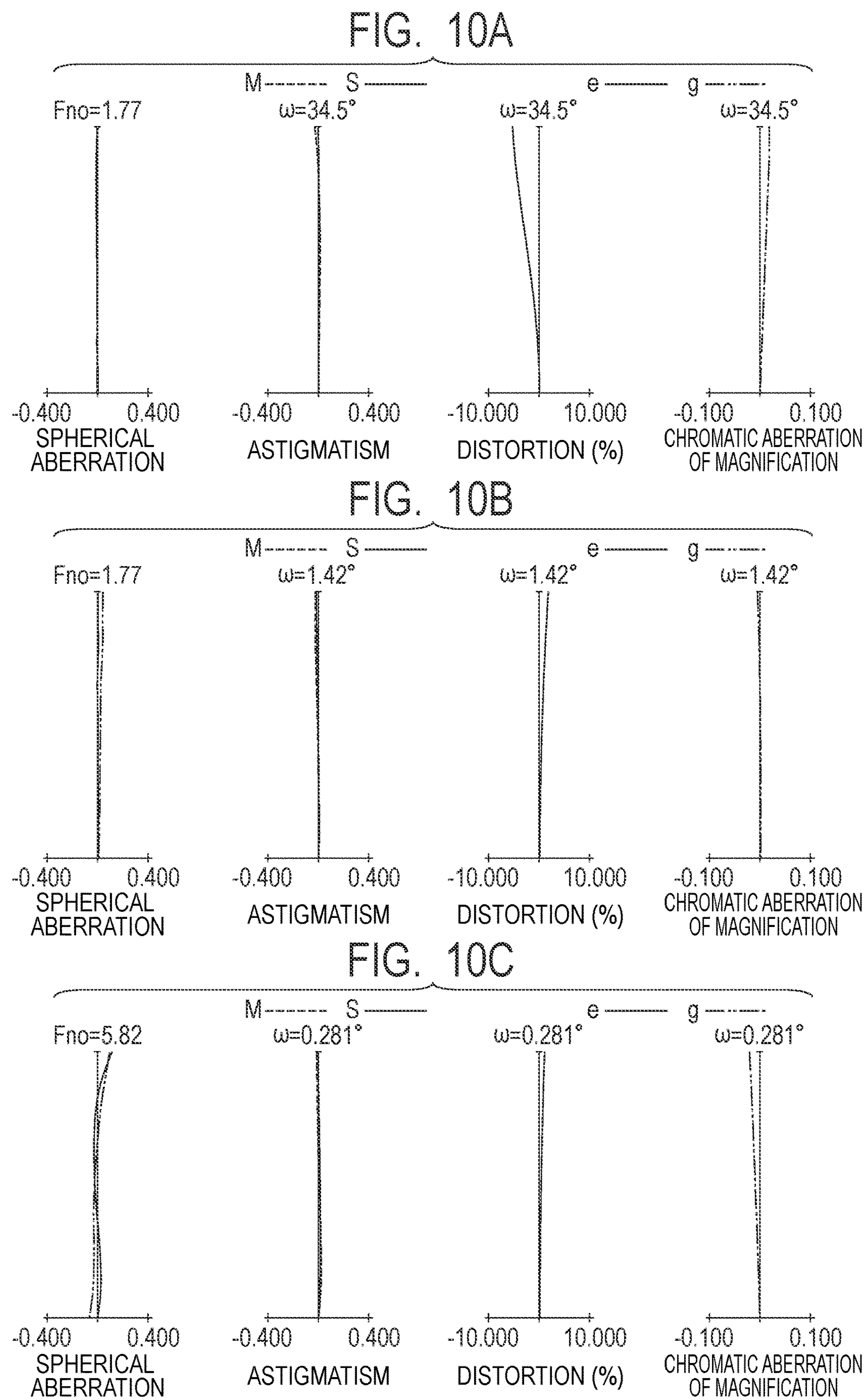
FIG. 10A is an aberration diagram when focusing on the object at infinity at the wide angle end according to Numerical Embodiment 5.
FIG. 10B is an aberration diagram when focusing on the object at infinity at f=221.43 mm according to Numerical Embodiment 5.
FIG. 10C is an aberration diagram when focusing on the object at infinity at the telephoto end according to Numerical Embodiment 5.

FIG. 9 is a lens sectional view of a zoom lens according to Embodiment 5 (Numerical Embodiment 5) of the present invention when the zoom lens is focused on an object at infinity at the wide angle end. In FIGS. 10A to 10C, FIG. 10A is a longitudinal aberration diagram at the wide-angle end of Numerical Embodiment 5, FIG. 10B is a longitudinal aberration diagram at focal length 221.43 mm of Numerical Embodiment 5, and FIG. 10C is a longitudinal aberration diagram at the telephoto end of Numerical Embodiment 5. Each aberration diagram is a longitudinal aberration diagram when focusing on an object at infinity.

In FIG. 9, the zoom lens includes in order from the object side, a first lens unit L1 having a positive refractive power that is configured to move for focusing. Further, the zoom lens includes a second lens unit L2 having a negative refractive power that is configured to move toward the image side, a third lens unit L3 having a negative refractive power that is configured to move toward the image side, and a fourth lens unit L4 having a positive refractive power that is configured to move toward the object side, for zooming from the wide-angle end to the telephoto end. The zoom lens further includes a fifth lens unit L5 having a positive refractive power that is configured to move non-linearly on the optical axis in conjunction with the movement of the second lens unit L2, the third lens unit L3, and the fourth lens unit L4 to correct image plane variation caused by zooming. The zoom lens further includes a sixth lens unit L6 which does not move for zooming and has an imaging effect. In this embodiment, the N lens unit corresponds to the third lens unit L3, the P lens unit corresponds to the fourth lens unit L4, the V lens group corresponds to the second lens unit L2 and the third lens unit L3, and the C lens unit corresponds to the fourth lens unit L4 and the fifth lens unit L5. Note that focal length 221.43 mm is a zoom position at which the combined lateral magnification of the V lens group is −1.

In this embodiment, the second lens unit L2, the third lens unit L3, the fourth lens unit L4, and the fifth lens unit L5 constitute a zooming optical system. An aperture stop SP is disposed between the fifth lens unit L5 and the sixth lens unit L6. The aperture stop SP does not move in the optical axis direction for zooming.

The first lens unit L1 corresponds to a first surface to a twelfth surface. The second lens unit L2 corresponds to a thirteenth surface to a seventeenth surface, the third lens unit L3 corresponds to an eighteenth surface to a twentieth surface, the fourth lens unit L4 corresponds to a twenty first surface to a twenty sixth surface, and the fifth lens unit L5 corresponds to a twenty seventh surface to a thirty first surface. The sixth lens unit L6 corresponds to a thirty second surface to a fifty fourth surface. The first lens unit L1 includes a first lens subunit L11 that is configured not to move for focusing, and a second lens subunit L12 having a positive refractive power that is configured to move for focusing from the infinity side to the close side. The first lens subunit L11 corresponds to the first surface to the sixth surface, and the second lens subunit L12 corresponds to the seventh surface to the twelfth surface. The first lens unit L1 includes six lenses, that is, a biconcave lens, a biconvex lens, a biconvex lens, a biconvex lens, a meniscus-convex lens having a concave surface on the image side, and a meniscus-convex lens having a concave surface on the image side in order from the object side.

Table 1 shows values corresponding to the inequalities in this embodiment. This embodiment satisfies inequalities (1) to (13), and achieves a zoom lens having a wide angle of view, a high zoom ratio, a small size and a light weight, and high optical performance over the entire zoom range by appropriately setting the refractive power of the first lens unit and the amounts of movement of the lens units that move for zooming.

Embodiment 6

Figure 11:
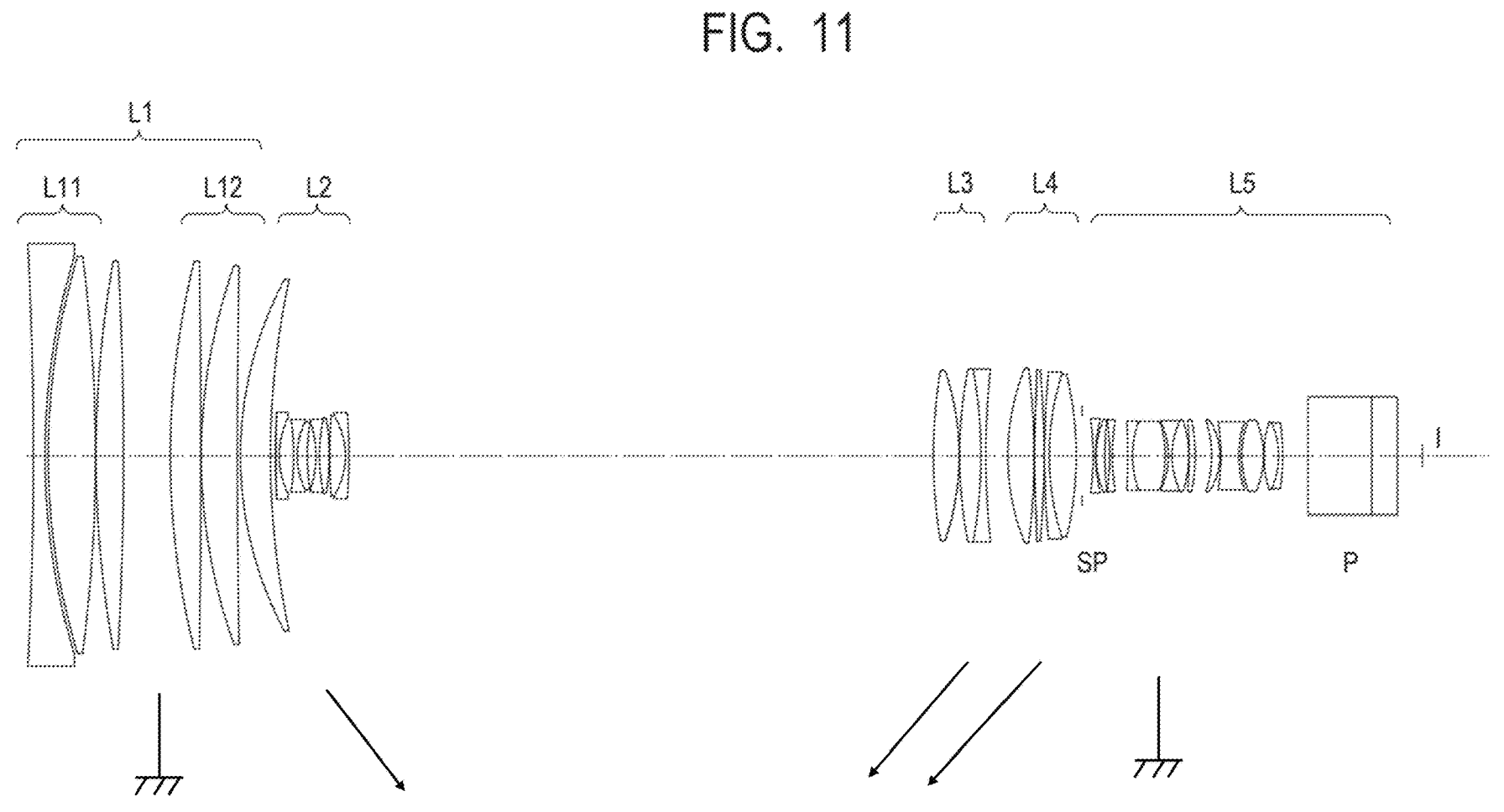
Figures 12A, 12B, 12C:
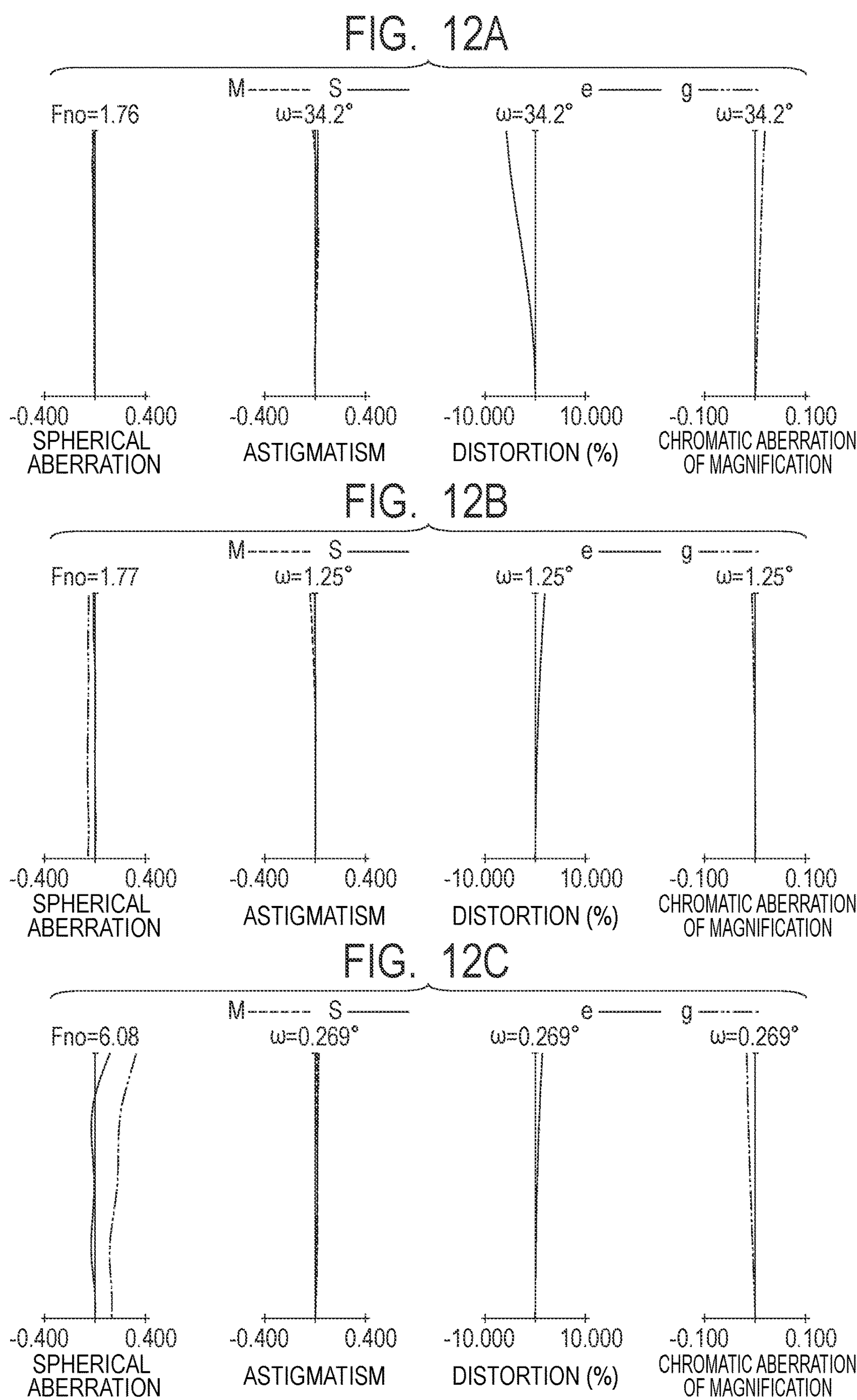
FIG. 12A is an aberration diagram when focusing on the object at infinity at the wide angle end according to Numerical Embodiment 6.
FIG. 12B is an aberration diagram when focusing on the object at infinity at f=251.82 mm according to Numerical Embodiment 6.
FIG. 12C is an aberration diagram when focusing on the object at infinity at the telephoto end according to Numerical Embodiment 6.

FIG. 11 is a lens sectional view of the zoom lens according to Embodiment 6 (Numerical Embodiment 6) of the present invention when the zoom lens is focused on an object at infinity at the wide angle end. In FIGS. 12A to 12C, FIG. 12A is a longitudinal aberration diagram at the wide-angle end of Numerical Embodiment 6, FIG. 12B is a longitudinal aberration diagram at focal length 251.82 mm of Numerical Embodiment 6, and FIG. 12C is a longitudinal aberration diagram at the telephoto end of Numerical Embodiment 6. Each aberration diagram is a longitudinal aberration diagram when focusing on an object at infinity.

In FIG. 11, the zoom lens includes in order from the object side, a first lens unit L1 having a positive refractive power that is configured to move for focusing. The zoom lens further includes a second lens unit L2 having a negative refractive power that is configured to move toward the image side and a third lens unit L3 having a positive refractive power that is configured to move toward the object side for zooming from the wide angle end to the telephoto end. The zoom lens further includes a fourth lens unit L4 having a positive refractive power that is configured to move non-linearly on the optical axis in conjunction with the movement of the second lens unit L2 and the third lens unit L3 to correct image plane variation caused by zooming. The zoom lens further includes a fifth lens unit L5 which does not move for zooming and has an imaging effect. In this embodiment, the N lens unit corresponds to the second lens unit L2, the P lens unit corresponds to the fourth lens unit L4, the V lens group corresponds to the second lens unit L2, and the C lens group corresponds to the third lens unit L3 and the fourth lens unit L4. Note that focal length 208.08 mm is a zoom position at which the combined lateral magnification of the V lens group and the combined lateral magnification of the C lens group become −1 at the same time.

In this embodiment, the second lens unit L2, the third lens unit L3, and the fourth lens unit L4 constitute a zooming optical system. An aperture stop SP is disposed between the fourth lens unit L4 and the fifth lens unit L5. The aperture stop SP is configured not to move in the optical axis direction for zooming.

The first lens unit L1 corresponds to a first surface to a twelfth surface. The second lens unit L2 corresponds to a thirteenth surface to a twenty third surface, the third lens unit L3 corresponds to a twenty fourth surface to a twenty eighth surface, and the fourth lens unit L4 corresponds to a twenty ninth surface to a thirty fifth surface. The fifth lens unit L5 corresponds to a thirty sixth surface to a fifty ninth surface. The first lens unit L1 includes a first lens subunit L11 that is configured not to move for focusing, and a second lens subunit L12 having a positive refractive power that is configured to move for focusing from the infinity side to the close side. The first lens unit L11 corresponds to the first surface to the sixth surface, and the second lens subunit L12 corresponds to the seventh surface to the twelfth surface. The first lens unit L1 includes six lenses, that is, a biconcave lens, a biconvex lens, a biconvex lens, a biconvex lens, a meniscus-convex lens having a concave surface on the image side, and a meniscus-convex lens having a concave surface on the image side in order from the object side.

Table 1 shows values corresponding to the inequalities in this embodiment. This embodiment satisfies inequalities (1) to (13), and achieves a zoom lens having a wide angle of view, a high zoom ratio, a small size and a light weight, and high optical performance over the entire zoom range by appropriately setting the refractive power of the first lens unit and the amounts of movement of the lens units that move for zooming.

Embodiment 7

Figure 13:
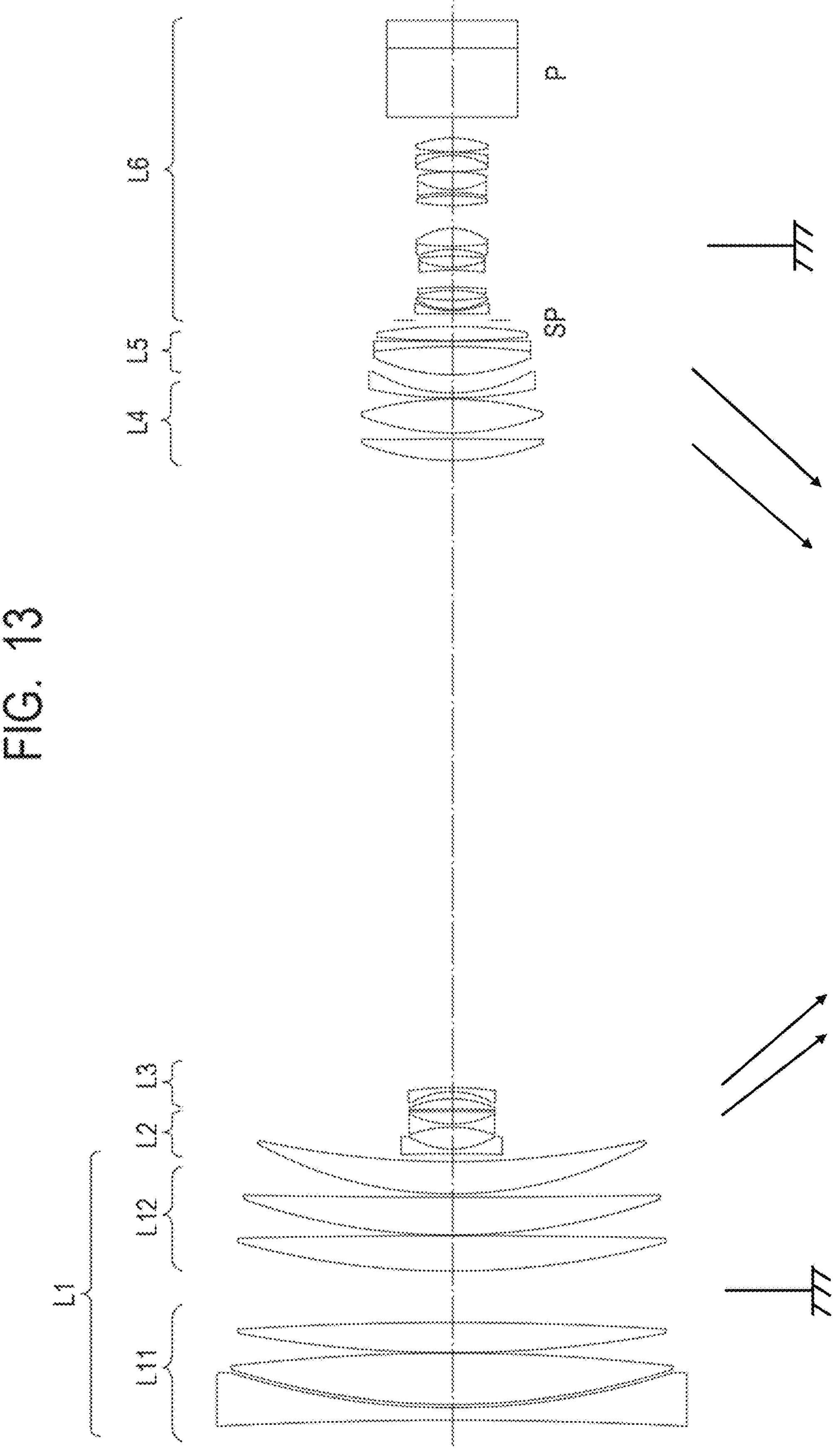
FIG. 13 is a lens sectional view when focusing on the object at infinity at the wide angle end according to Numerical Embodiment 7.
Figures 14A, 14B, 14C:
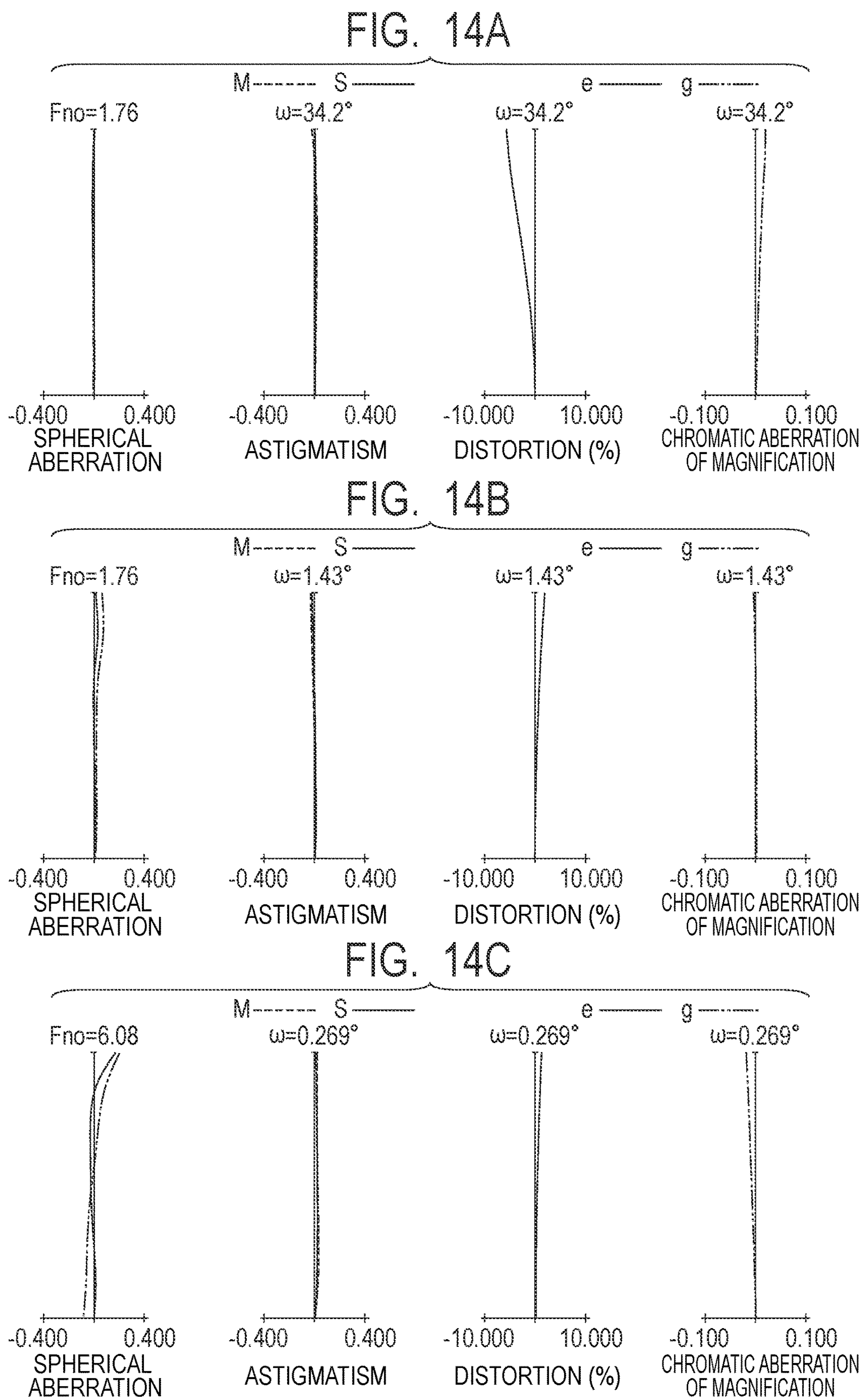
FIG. 14A is an aberration diagram when focusing on the object at infinity at the wide angle end according to Numerical Embodiment 7.
FIG. 14B is an aberration diagram when focusing on the object at infinity at 219.95 mm according to Numerical Embodiment 7.
FIG. 14C is an aberration diagram when focusing on the object at infinity at the telephoto end according to Numerical Embodiment 7.

FIG. 13 is a lens sectional view of a zoom lens according to Embodiment 7 (Numerical Embodiment 7) of the present invention when the zoom lens is focused on an object at infinity at the wide angle end. In FIGS. 14 to 14C, FIG. 14A is a longitudinal aberration diagram at the wide-angle end of Numerical Embodiment 7, FIG. 14B is a longitudinal aberration diagram at focal length 219.95 mm of Numerical Embodiment 7, and FIG. 14C is a longitudinal aberration diagram at the telephoto end of Numerical Embodiment 7. Each aberration diagram is a longitudinal aberration diagram when focusing on an object at infinity.

In FIG. 13, the zoom lens includes in order from the object side, a first lens unit L1 having a positive refractive power that is configured to move for focusing. Further, the zoom lens includes a second lens unit L2 having a negative refractive power that is configured to move toward the image side, a third lens unit L3 having a positive refractive power that is configured to move toward the image side, and a fourth lens unit L4 having a positive refractive power that is configured to move toward the object side for zooming from the wide-angle end to the telephoto end. The zoom lens further includes a fifth lens unit L5 having a positive refractive power that is configured to move non-linearly on the optical axis in conjunction with the movement of the second lens unit L3, the third lens unit L4, and the fourth lens unit L5 to correct image plane variation caused by zooming. The zoom lens further includes a sixth lens unit L6 which does not move for zooming and has an imaging effect. In this embodiment, the N lens unit corresponds to the second lens unit L2, the P lens unit corresponds to the fourth lens unit L4, the V lens group corresponds to the second lens unit L2 and the third lens unit L3, and the C lens group corresponds to the fourth lens unit L4 and the fifth lens unit L5. Note that focal length 219.95 mm is a zoom position at which the combined lateral magnification of the V lens group is −1.

In this embodiment, the second lens unit L2, the third lens unit L3, the fourth lens unit L4, and the fifth lens unit L5 constitute a zooming optical system. An aperture stop SP is disposed between the fifth lens unit L5 and the sixth lens unit L6. The aperture stop SP is configured not to move in the optical axis direction for zooming.

The first lens unit L1 corresponds to a first surface to a twelfth surface. The second lens unit L2 corresponds to a thirteenth surface to a seventeenth surface, the third lens unit L3 corresponds to an eighteenth surface to a twenty first surface, the fourth lens unit L4 corresponds to a twenty second surface to a twenty seventh surface, and the fifth lens unit L5 corresponds to a twenty eighth surface to a thirty second surface. The sixth lens unit L6 corresponds to a thirty third surface to a fifty fifth surface. The first lens unit L1 includes a first lens subunit L11 that is configured not to move for focusing, and a second lens subunit L12 having a positive refractive power that is configured move for focusing from the infinity side to the close side. The first lens subunit L11 corresponds to the first surface to the sixth surface, and the second lens subunit L12 corresponds to the seventh surface to the twelfth surface. The first lens unit L1 includes six lenses, that is, a biconcave lens, a biconvex lens, a biconvex lens, a biconvex lens, a meniscus-convex lens having a concave surface on the image side, and a meniscus-convex lens having a concave surface on the image side in order from the object side.

Table 1 shows values corresponding to the inequalities in this embodiment. This embodiment satisfies inequalities (1) to (13), and achieves a zoom lens having a wide angle of view, a high zoom ratio, a small size and a light weight, and high optical performance over the entire zoom range by appropriately setting the refractive power of the first lens unit and the amounts of movement of the lens units that move for zooming.

Although the preferred embodiments of the present invention have been described above, the present invention is not limited to these embodiments, and various modifications and changes can be made within the scope of the gist thereof. A feature of the present invention is to appropriately set the lens configuration, the refractive power, and the glass material of the first lens unit, and even when the rear lens unit which is a lens unit closer to the image side than the second lens unit has a configuration other than those of Numerical Embodiments 1 to 7, the effect of the present invention can be achieved.

Numerical Embodiment 1

| Unit mm | | | | | |
|---|---|---|---|---|---|
| Surface data | | | | | |
| Surface number | r | d | nd | νd | Effective diameter |
| 1 | −2221.349 | 6.00 | 1.83481 | 42.7 | 218.21 |
| 2 | 342.333 | 1.50 | | | 205.55 |
| 3 | 340.133 | 24.31 | 1.43387 | 95.1 | 204.91 |
| 4 | −911.250 | 0.20 | | | 203.54 |
| 5 | 565.719 | 14.49 | 1.43387 | 95.1 | 198.63 |
| 6 | −1543.644 | 24.80 | | | 198.74 |
| 7 | 376.540 | 17.36 | 1.43387 | 95.1 | 198.96 |
| 8 | −3838.033 | 0.25 | | | 198.53 |
| 9 | 295.848 | 17.80 | 1.43387 | 95.1 | 193.97 |
| 10 | 3814.344 | 1.60 | | | 192.94 |
| 11 | 192.957 | 15.11 | 1.43387 | 95.1 | 180.65 |
| 12 | 420.467 | (variable) | | | 179.06 |
| 13* | −238.965 | 2.20 | 2.00330 | 28.3 | 45.54 |
| 14 | 36.896 | 10.74 | | | 38.74 |
| 15 | −52.546 | 1.45 | 1.80610 | 40.9 | 37.98 |
| 16 | 47.404 | 11.69 | 1.89286 | 20.4 | 39.04 |
| 17 | −48.436 | 3.85 | | | 39.26 |
| 18 | −38.895 | 2.00 | 1.83481 | 42.7 | 36.51 |
| 19 | −128.592 | (variable) | | | 38.68 |
| 20 | 120.021 | 10.14 | 1.78800 | 47.4 | 82.48 |
| 21* | −749.646 | 2.46 | | | 82.39 |
| 22 | 119.605 | 16.42 | 1.43875 | 94.7 | 82.54 |
| 23 | −148.456 | 0.50 | | | 81.84 |
| 24 | 181.335 | 2.50 | 1.85478 | 24.8 | 75.70 |
| 25 | 74.456 | (variable) | | | 71.70 |
| 26 | 88.360 | 13.64 | 1.49700 | 81.5 | 71.29 |
| 27 | −302.319 | 2.60 | 1.84666 | 23.8 | 69.97 |
| 28 | 10294.031 | 0.20 | | | 68.98 |
| 29* | 293.116 | 6.81 | 1.53775 | 74.7 | 68.28 |
| 30 | −219.650 | (variable) | | | 67.50 |
| 31(stop) | ∞ | 2.74 | | | 34.39 |
| 32 | −607.740 | 1.40 | 1.88300 | 40.8 | 32.67 |
| 33 | 41.820 | 0.70 | | | 31.19 |
| 34 | 33.865 | 4.29 | 1.80810 | 22.8 | 31.34 |
| 35 | 91.433 | 4.58 | | | 30.64 |
| 34 | −66.359 | 1.50 | 1.88300 | 40.8 | 29.92 |
| 37 | −286.035 | 8.19 | | | 29.89 |
| 38 | −149.141 | 1.50 | 1.89190 | 37.1 | 28.99 |
| 39 | 45.053 | 6.01 | 1.84666 | 23.8 | 29.14 |

-continued

| Unit mm | | | | | |
|---|---|---|---|---|---|
| 40 | −128.089 | 3.18 | | | 29.28 |
| 41 | −43.757 | 1.50 | 1.88300 | 40.8 | 29.12 |
| 42 | 116.859 | 8.22 | 1.51742 | 52.4 | 30.48 |
| 43 | −29.469 | 10.21 | | | 31.56 |
| 44 | 79.819 | 4.96 | 1.53172 | 48.8 | 31.41 |
| 45 | −88.967 | 1.40 | | | 31.11 |
| 46 | −82.335 | 1.50 | 1.89190 | 37.1 | 30.54 |
| 47 | 34.621 | 7.78 | 1.48749 | 70.2 | 30.30 |
| 48 | −73.557 | 0.20 | | | 30.90 |
| 49 | 130.522 | 7.48 | 1.51633 | 64.1 | 31.25 |
| 50 | −32.217 | 1.50 | 1.88300 | 40.8 | 31.26 |
| 51 | −85.050 | 0.20 | | | 32.12 |
| 52 | 90.792 | 7.25 | 1.54814 | 45.8 | |
| 53 | −46.746 | 10.00 | | | 32.06 |
| 54 | ∞ | 33.00 | 1.60859 | 46.4 | 60.00 |
| 55 | ∞ | 13.20 | 1.51633 | 64.2 | 60.00 |
| 56 | ∞ | 13.00 | | | 60.00 |
| image plane | ∞ | | | | |

Aspherical data 13-th surface

K = −1.93181e+00 A 4 = 2.22919e−06 A 6 = 2.38151e−08 A 8 = 7.72743e−10 A10 = 2.13595e−12 A12 = −3.64187e−15 A14 = −4.78958e−18 A16 = −3.47247e−22
A 3 = 2.52939e−07 A 5 = −4.19447e−08 A 7 = −5.95656e−09 A 9 = −5.68561e−11 A11 = −4.13651e−15 A13 = 1.87641e−16 A15 = 6.43023e−20

21-st surface

K = 1.95058e+00 A 4 = 3.74052e−07 A 6 = 1.99549e−10 A 8 = 2.51258e−13 A10 = −2.73849e−17 A12 = −1.59352e−19 A14 = −1.48582e−23 A16 = −5.53240e−27
A 3 = −1.37836e−07 A 5 = −2.64991e−09 A 7 = −9.23121e−12 A 9 = −3.74119e−15 A11 = 5.03388e−18 A13 = 1.89531e−21 A15 = 4.46991e−25

29-th surface

K = −2.00000e+00 A 4 = 1.60386e−07 A 6 = 1.28452e−08 A 8 = 5.45892e−11 A10 = −6.18393e−15 A12 = 3.22244e−18 A14 = 3.40708e−20 A16 = 1.98023e−24
A 3 = −1.02506e−06 A 5 = −8.91670e−08 A 7 = −1.10781e−09 A 9 = −1.25958e−12 A11 = 8.63627e−16 A13 = −1.17716e−18 A15 = −4.20681e−22

Various data

| Zoom ratio | 144.44 | | |
|---|---|---|---|
| | Wide angle end | Intermediate | Telephoto End |
| Focal length | 8.10 | 220.03 | 1169.95 |
| F-number | 1.76 | 1.76 | 6.08 |
| Half angle of view | 34.18 | 1.43 | 0.27 |
| Image Height | 5.50 | 5.50 | 5.50 |
| Total lens length | 680.44 | 680.44 | 680.44 |
| BF | 13.00 | 13.00 | 13.00 |
| d12 | 4.04 | 184.81 | 197.98 |
| d19 | 297.46 | 85.16 | 2.00 |
| d25 | 9.84 | 4.30 | 8.70 |
| d30 | 2.98 | 40.05 | 105.65 |
| d56 | 13.00 | 13.00 | 13.00 |
| Entrance pupil position | 129.66 | 2638.84 | 17486.29 |
| Exit pupil position | 237.07 | 237.07 | 237.07 |
| Front principal point position | 138.06 | 3074.94 | 24765.04 |
| Rear principal point position | 4.90 | −207.03 | −1156.95 |

Zoom lens unit data

| Unit | Leading surface | Focal length | Lens structure length | Front principal point position | Rear principal point position |
|---|---|---|---|---|---|
| 1 | 1 | 251.69 | 123.43 | 71.51 | −18.33 |
| 2 | 13 | −22.51 | 31.93 | 3.51 | −18.59 |
| 3 | 20 | 121.34 | 32.01 | −6.54 | −25.79 |
| 4 | 26 | 118.74 | 23.25 | 5.37 | −10.20 |
| 5 | 31 | 46.47 | 142.50 | 59.14 | 20.10 |

Numerical Embodiment 2

| Unit mm | | | | | |
|---|---|---|---|---|---|
| Surface data | | | | | |
| Surface number | r | d | nd | vd | Effective diameter |
| 1 | −1043.825 | 5.50 | 1.83481 | 42.7 | 220.03 |
| 2 | 366.721 | 1.50 | | | 207.67 |
| 3 | 364.032 | 28.91 | 1.43387 | 95.1 | 207.11 |
| 4 | −609.037 | 0.20 | | | 204.84 |
| 5 | 646.639 | 15.07 | 1.43387 | 95.1 | 201.33 |
| 6 | −1086.757 | 21.44 | | | 201.51 |
| 7 | 372.369 | 19.69 | 1.43387 | 95.1 | 202.24 |
| 8 | −1701.210 | 0.25 | | | 201.82 |
| 9 | 266.948 | 18.73 | 1.43387 | 95.1 | 195.72 |
| 10 | 1888.740 | 1.60 | | | 194.58 |
| 11 | 179.319 | 16.25 | 1.43875 | 94.7 | 180.92 |
| 12 | 387.193 | (variable) | | | 179.22 |
| 13 | −218.239 | 2.20 | 2.00330 | 28.3 | 42.44 |
| 14 | 32.360 | 11.03 | | | 35.55 |
| 15 | −40.060 | 1.45 | 1.80610 | 40.9 | 34.75 |
| 16 | 49.409 | 12.39 | 1.89286 | 20.4 | 36.48 |
| 17 | −44.678 | 3.76 | | | 37.64 |
| 18 | −35.178 | 2.00 | 1.83481 | 42.7 | 37.82 |
| 19 | −70.135 | (variable) | | | 40.50 |
| 20 | 152.043 | 9.44 | 1.78800 | 47.4 | 79.79 |
| 21* | −1353.842 | 6.22 | | | 80.05 |
| 22 | 107.185 | 17.31 | 1.43875 | 94.7 | 82.57 |
| 23 | −156.466 | 0.50 | | | 82.09 |
| 24 | 152.341 | 2.50 | 1.85478 | 24.8 | 77.10 |
| 25 | 75.362 | (variable) | | | 73.63 |
| 26 | 80.922 | 14.65 | 1.49700 | 81.5 | 73.82 |
| 27 | −299.009 | 0.50 | | | 72.71 |
| 28 | 415.877 | 2.50 | 1.84666 | 23.8 | 70.09 |
| 29 | 155.921 | 6.43 | 1.59522 | 67.7 | 68.14 |
| 30* | −946.891 | (variable) | | | 67.14 |
| 31(stop) | ∞ | 2.65 | | | 34.39 |
| 32 | −964.271 | 1.40 | 1.88300 | 40.8 | 32.78 |
| 33 | 42.981 | 0.58 | | | 31.38 |
| 34 | 33.712 | 4.47 | 1.80810 | 22.8 | 31.53 |
| 35 | 100.338 | 4.51 | | | 30.82 |
| 36 | −66.006 | 1.50 | 1.88300 | 40.8 | 30.04 |
| 37 | −836.881 | 8.65 | | | 29.96 |
| 38 | −357.842 | 1.50 | 1.89190 | 37.1 | 29.29 |
| 39 | 40.193 | 6.16 | 1.84666 | 23.8 | 29.28 |
| 40 | −272.917 | 2.91 | | | 29.32 |
| 41 | −60.533 | 1.50 | 1.88300 | 40.8 | 29.23 |
| 42 | 67.074 | 10.21 | 1.51742 | 52.4 | 30.22 |
| 43 | −29.932 | 8.33 | | | 31.68 |
| 44 | 55.256 | 5.15 | 1.53172 | 48.8 | 30.68 |
| 45 | −121.213 | 1.40 | | | 30.19 |
| 46 | −67.916 | 1.50 | 1.89190 | 37.1 | 29.83 |
| 47 | 30.576 | 7.87 | 1.48749 | 70.2 | 29.50 |
| 48 | −82.637 | 0.20 | | | 30.18 |
| 49 | 186.024 | 7.44 | 1.51633 | 64.1 | 30.61 |
| 50 | −29.654 | 1.50 | 1.88300 | 40.8 | 30.78 |
| 51 | −73.503 | 0.20 | | | 31.94 |
| 52 | 90.956 | 6.92 | 1.54814 | 45.8 | 32.44 |
| 53 | −40.757 | 10.00 | | | 32.36 |
| 54 | ∞ | 33.00 | 1.60859 | 46.4 | 60.00 |
| 55 | ∞ | 13.20 | 1.51633 | 64.2 | 60.00 |
| 56 | ∞ | 13.00 | | | 60.00 |
| image plane | ∞ | | | | |

Aspherical data 13-th surface

K = −2.00000e+00 A 4 = 3.44369e−06 A 6 = 1.75215e−08 A 8 = 7.54946e−10 A10 = 2.14912e−12 A12 = −3.63493e−15 A14 = −4.81730e−18 A16 = −2.42956e−22
A 3 = 2.85376e−07 A 5 = −2.62114e−08 A 7 = −5.36345e−09 A 9 = −5.75280e−11 A11 = −2.11882e−15 A13 = 1.84793e−16 A15 = 6.35958e−20

21-st surface

K = 2.00000e+00 A 4 = 2.64491e−07 A 6 = 1.64486e−10 A 8 = 2.81450e−13 A10 = −1.53239e−17 A12 = −1.64838e−19 A14 = −1.42788e−23 A16 = −8.46539e−27

-continued

| Unit mm |
|---|
| A 3 = −1.58738e−07 A 5 = −1.55150e−09 A 7 = −9.40854e−12 A 9 = −4.09584e−15 A11 = 4.65152e−18 A13 = 1.98486e−21 A15 = 6.05850e−25 |
| 30-th surface |
| K = −2.38519e+02 A 4 = 2.47257e−07 A 6 = 3.38998e−10 A 8 = 4.88176e−14 A10 = −2.01015e−16 A12 = 2.29490e−19 A14 = −2.08445e−22 A16 = 2.48948e−26 |
| A 3 = 4.99600e−07 A 5 = −1.93641e−09 A 7 = −1.30855e−11 A 9 = 1.12625e−14 A11 = −8.21095e−18 A13 = 5.19906e−21 A15 = 5.36432e−25 |

Various data

| Zoom ratio | 130.00 | | |
|---|---|---|---|
| | Wide angle end | Intermediate | Telephoto End |
| Focal length | 7.90 | 208.08 | 1026.97 |
| F-number | 1.76 | 1.76 | 5.34 |
| Half angle of view | 34.85 | 1.51 | 0.31 |
| Image Height | 5.50 | 5.50 | 5.50 |
| Total lens length | 673.04 | 673.04 | 673.04 |
| BF | 13.00 | 13.00 | 13.00 |
| d12 | 3.91 | 170.96 | 183.51 |
| d19 | 278.18 | 77.24 | 2.00 |
| d25 | 10.20 | 3.45 | 3.75 |
| d30 | 2.96 | 43.61 | 106.00 |
| d56 | 13.00 | 13.00 | 13.00 |
| Entrance pupil position | 127.37 | 2394.75 | 14430.30 |
| Exit pupil position | 232.15 | 232.15 | 232.15 |
| Front principal point position | 135.56 | 2800.39 | 20269.74 |
| Rear principal point position | 5.10 | −195.08 | −1013.97 |

Zoom lens unit data

| Unit | Leading surface | Focal length | Lens structure length | Front principal point position | Rear principal point position |
|---|---|---|---|---|---|
| 1 | 1 | 233.00 | 129.14 | 74.15 | −16.84 |
| 2 | 13 | −21.53 | 32.82 | 2.14 | −22.04 |
| 3 | 20 | 133.90 | 35.97 | −4.30 | −27.75 |
| 4 | 26 | 115.12 | 24.09 | 3.23 | −12.64 |
| 5 | 31 | 46.80 | 142.77 | 59.82 | 17.22 |

Numerical Embodiment 3

Unit mm

Surface data

| Surface number | r | d | nd | vd | Effective diameter |
|---|---|---|---|---|---|
| 1 | −2640.787 | 6.00 | 1.83481 | 42.7 | 217.94 |
| 2 | 336.021 | 1.50 | | | 205.56 |
| 3 | 333.782 | 24.22 | 1.43387 | 95.1 | 205.20 |
| 4 | −982.483 | 0.20 | | | 204.25 |
| 5 | 572.375 | 14.77 | 1.43387 | 95.1 | 203.94 |
| 6 | −1669.583 | 24.51 | | | 204.06 |
| 7 | 366.303 | 19.18 | 1.43387 | 95.1 | 204.59 |
| 8 | −2715.734 | 0.25 | | | 204.15 |
| 9 | 294.365 | 18.26 | 1.43387 | 95.1 | 198.83 |
| 10 | 2906.754 | 1.60 | | | 197.76 |
| 11 | 189.946 | 15.80 | 1.43387 | 95.1 | 184.45 |
| 12 | 408.286 | (variable) | | | 182.82 |
| 13* | −341.785 | 2.20 | 2.00330 | 28.3 | 42.45 |
| 14 | 34.515 | 10.27 | | | 36.00 |
| 15 | −46.098 | 1.45 | 1.80610 | 40.9 | 35.09 |
| 16 | 48.098 | 11.91 | 1.89286 | 20.4 | 35.96 |
| 17 | −45.986 | 1.41 | | | 37.56 |
| 18 | −37.502 | 2.00 | 1.83481 | 42.7 | 37.56 |
| 19 | −115.875 | (variable) | | | 40.26 |
| 20 | 101.863 | 12.07 | 1.76385 | 48.5 | 84.37 |
| 21* | −775.375 | 3.25 | | | 84.15 |

-continued

| Unit mm | | | | | |
|---|---|---|---|---|---|
| 22 | 195.252 | 13.40 | 1.43875 | 94.7 | 83.98 |
| 23 | −146.652 | 0.85 | | | 83.57 |
| 24 | 253.827 | 2.50 | 1.85478 | 24.8 | 78.51 |
| 25 | 81.675 | (variable) | | | 74.95 |
| 26 | 79.787 | 14.31 | 1.49700 | 81.5 | 76.40 |
| 27 | −369.567 | 2.60 | 1.84666 | 23.8 | 75.63 |
| 28 | 1334.585 | 0.20 | | | 74.64 |
| 29* | 223.959 | 9.17 | 1.53775 | 74.7 | 74.08 |
| 30 | −153.782 | (variable) | | | 73.44 |
| 31(stop) | ∞ | 2.87 | | | 33.68 |
| 32 | −377.940 | 1.40 | 1.88300 | 40.8 | 31.89 |
| 33 | 36.203 | 0.78 | | | 30.30 |
| 34 | 30.540 | 5.35 | 1.80810 | 22.8 | 30.65 |
| 35 | 204.910 | 3.50 | | | 29.95 |
| 36 | −77.957 | 1.50 | 1.88300 | 40.8 | 28.99 |
| 37 | 193.909 | 9.11 | | | 28.59 |
| 38 | −301.472 | 1.50 | 1.89190 | 37.1 | 27.80 |
| 39 | 39.221 | 3.85 | 1.84666 | 23.8 | 27.77 |
| 40 | 138.609 | 5.30 | | | 27.79 |
| 41 | −80.184 | 1.50 | 1.88300 | 40.8 | 28.44 |
| 42 | 137.813 | 8.33 | 1.51742 | 52.4 | 29.41 |
| 43 | −29.801 | 10.33 | | | 30.71 |
| 44 | 59.065 | 5.04 | 1.53172 | 48.8 | 30.72 |
| 45 | −116.981 | 1.40 | | | 30.34 |
| 46 | −68.241 | 1.50 | 1.89190 | 37.1 | 30.03 |
| 47 | 36.062 | 7.24 | 1.48749 | 70.2 | 29.98 |
| 48 | −89.814 | 0.20 | | | 30.65 |
| 49 | 104.175 | 7.19 | 1.51633 | 64.1 | 31.20 |
| 50 | −36.575 | 1.50 | 1.88300 | 40.8 | 31.28 |
| 51 | −82.065 | 0.20 | | | 31.99 |
| 52 | 78.404 | 6.28 | 1.54814 | 45.8 | 32.11 |
| 53 | −52.540 | 10.00 | | | 32.09 |
| 54 | ∞ | 33.00 | 1.60859 | 46.4 | 60.00 |
| 55 | ∞ | 13.20 | 1.51633 | 64.2 | 60.00 |
| 56 | ∞ | 12.99 | | | 60.00 |
| image plane | ∞ | | | | |

Aspherical data 13-th surface

K = −1.98003e+00 A 4 = 2.20198e−06 A 6 = 2.51518e−08 A 8 = 8.03825e−10 A10 = 1.57670e−12 A12 = −4.66646e−15 A14 = −2.78721e−18 A16 = 1.80718e−22
A 3 = 2.41302e−07 A 5 = −3.66593e−08 A 7 = −6.34925e−09 A 9 = −5.47960e−11 A11 = 3.59373e−14 A13 = 1.67667e−16 A15 = 1.19221e−20

21-th surface

K = 7.94738e−01 A 4 = 3.90977e−07 A 6 = −1.66736e−09 A 8 = −7.36421e−12 A10 = 6.31669e−15 A12 = 1.52958e−17 A14 = 2.58533e−21 A16 = −3.23171e−28
A 3 = −9.36022e−08 A 5 = 9.57405e−09 A 7 = 1.50044e−10 A 9 = 1.28810e−13 A11 = −4.88837e−16 A13 = −2.68027e−19 A15 = −1.07510e−23

29-th surface

K = −1.86470e+00 A 4 = −1.88288e−07 A 6 = 1.02042e−08 A 8 = 5.62942e−11 A10 = 5.40989e−14 A12 = 6.52653e−17 A14 = 3.92509e−20 A16 = 1.70284e−24
A 3 = −5.92818e−07 A 5 = −6.42825e−08 A 7 = −9.73542e−10 A 9 = −2.05372e−12 A11 = −1.63236e−15 A13 = −2.05465e−18 A15 = −4.02843e−22

Various data

Zoom ratio 140.00

| | Wide angle end | Intermediate | Telephoto End |
|---|---|---|---|
| Focal length | 8.20 | 260.97 | 1147.98 |
| F-number | 1.77 | 1.76 | 5.80 |
| Half angle of view | 33.85 | 1.21 | 0.27 |
| Image Height | 5.50 | 5.50 | 5.50 |
| Total lens length | 680.06 | 680.06 | 680.06 |
| BF | 12.99 | 12.99 | 12.99 |
| d12 | 3.67 | 183.40 | 195.07 |
| d19 | 289.44 | 65.94 | 2.00 |
| d25 | 15.11 | 13.50 | 2.71 |
| d30 | 2.90 | 48.27 | 111.34 |
| d56 | 12.99 | 12.99 | 12.99 |

-continued

| Unit mm | | | |
|---|---|---|---|
| Entrance pupil position | 130.21 | 2865.72 | 16950.50 |
| Exit pupil position | 181.90 | 181.90 | 181.90 |
| Front principal point position | 138.80 | 3529.93 | 25900.81 |
| Rear principal point position | 4.79 | −247.98 | −1134.98 |

Zoom lens unit data

| Unit | Leading surface | Focal length | Lens structure length | Front principal point position | Rear principal point position |
|---|---|---|---|---|---|
| 1 | 1 | 250.00 | 126.29 | 71.99 | −19.77 |
| 2 | 13 | −22.00 | 29.24 | 2.85 | −17.70 |
| 3 | 20 | 134.69 | 32.07 | −9.12 | −28.21 |
| 4 | 26 | 98.91 | 26.28 | 6.97 | −10.85 |
| 5 | 31 | 41.99 | 142.06 | 56.80 | 20.82 |

Numerical Embodiment 4

Unit mm

Surface data

| Surface number | r | d | nd | vd | Effective diameter |
|---|---|---|---|---|---|
| 1 | −1555.043 | 5.00 | 1.83481 | 42.7 | 214.10 |
| 2 | 353.750 | 1.50 | | | 202.74 |
| 3 | 351.223 | 24.01 | 1.43387 | 95.1 | 202.15 |
| 4 | −794.951 | 0.20 | | | 200.89 |
| 5 | 517.913 | 16.02 | 1.43387 | 95.1 | 201.35 |
| 6 | −1396.076 | 23.31 | | | 201.45 |
| 7 | 389.370 | 19.31 | 1.43387 | 95.1 | 202.46 |
| 8 | −1592.411 | 0.25 | | | 202.12 |
| 9 | 312.362 | 16.50 | 1.43387 | 95.1 | 197.53 |
| 10 | 2189.440 | 1.65 | | | 196.55 |
| 11 | 178.724 | 16.99 | 1.43387 | 95.1 | 184.19 |
| 12 | 389.334 | (variable) | | | 182.60 |
| 13* | −221.493 | 2.20 | 2.00330 | 28.3 | 45.55 |
| 14 | 41.464 | 9.65 | | | 39.35 |
| 15 | −63.287 | 1.45 | 1.80610 | 40.9 | 38.48 |
| 16 | 43.505 | 11.97 | 1.89286 | 20.4 | 38.69 |
| 17 | −50.745 | 3.45 | | | 38.60 |
| 18 | −39.588 | 2.00 | 1.83481 | 42.7 | 35.67 |
| 19 | −377.493 | (variable) | | | 35.90 |
| 20 | 121.892 | 10.03 | 1.76385 | 48.5 | 82.90 |
| 21* | −726.216 | (variable) | | | 82.81 |
| 22 | 113.831 | 16.58 | 1.43875 | 94.7 | 83.01 |
| | −155.147 | 0.68 | | | 82.30 |
| 24 | 189.566 | 2.20 | 1.85025 | 30.1 | 76.16 |
| 25 | 67.579 | 4.50 | 1.48749 | 70.2 | 71.71 |
| 26 | 84.449 | (variable) | | | 71.00 |
| 27 | 91.763 | 12.23 | 1.49700 | 81.5 | 70.35 |
| 28 | −492.764 | 2.20 | 1.84666 | 23.8 | 69.05 |
| 29 | 735.845 | 0.15 | | | 68.08 |
| 30* | 206.961 | 7.67 | 1.53775 | 74.7 | 67.46 |
| 31 | −207.052 | (variable) | | | 66.66 |
| 32(stop) | ∞ | 4.46 | | | 35.77 |
| 33 | −225.885 | 1.40 | 1.88300 | 40.8 | 33.05 |
| 34 | 38.662 | 0.88 | | | 31.53 |
| 35 | 33.392 | 4.14 | 1.80810 | 22.8 | 31.94 |
| 36 | 74.832 | 4.95 | | | 31.35 |
| 37 | −69.438 | 1.50 | 1.88300 | 40.8 | 30.92 |
| 38 | −113.828 | 7.51 | | | 31.08 |
| 39 | −98.347 | 1.50 | 1.89190 | 37.1 | 30.28 |
| 40 | 69.830 | 5.65 | 1.84666 | 23.8 | 30.68 |
| 41 | −132.325 | 1.10 | | | 30.99 |
| 42 | −237.028 | 1.50 | 1.88300 | 40.8 | 30.97 |
| 43 | 55.024 | 13.41 | 1.51742 | 52.4 | 31.21 |
| 44 | −48.886 | 7.46 | | | 33.02 |
| 45 | 188.178 | 4.26 | 1.53172 | 48.8 | 32.60 |
| 46 | −86.116 | 1.40 | | | 32.43 |
| 47 | −55.004 | 1.50 | 1.89190 | 37.1 | 32.25 |
| 48 | 136.879 | 7.29 | 1.48749 | 70.2 | 32.81 |

-continued

| Unit mm | | | | | |
|---|---|---|---|---|---|
| 49 | −38.771 | 0.20 | | | 33.35 |
| 50 | 97.451 | 7.09 | 1.51633 | 64.1 | 32.58 |
| 51 | −42.844 | 1.50 | 1.88300 | 40.8 | 32.04 |
| 52 | −230.030 | 0.20 | | | 32.01 |
| 53 | 93.901 | 5.11 | 1.54814 | 45.8 | 31.72 |
| 54 | −76.659 | 10.00 | | | 31.27 |
| 55 | ∞ | 33.00 | 1.60859 | 46.4 | 60.00 |
| 56 | ∞ | 13.20 | 1.51633 | 64.2 | 60.00 |
| 57 | ∞ | 12.90 | | | 60.00 |
| image plane | ∞ | | | | |

Aspherical data 13-th surface

K = 2.57263e−02 A 4 = 2.06021e−06 A 6 = 2.95254e−08 A 8 = 8.51538e−10 A10 = 3.03005e−12 A12 = −4.03732e−15 A14 = −3.74363e−18 A16 = 5.40859e−22
A 3 = −1.28433e−07 A 5 = −8.75942e−08 A 7 = −6.44264e−09 A 9 = −6.86019e−11 A11 = −2.96767e−14 A13 = 2.11032e−16 A15 = −6.68244e−22

21-st surface

K = −1.16140e+00 A 4 = 4.16737e−07 A 6 = 3.33199e−10 A 8 = 2.60425e−13 A10 = −6.05661e−18 A12 = −1.66061e−19 A14 = −1.22475e−23 A16 = −3.80232e−27
A 3 = −2.58118e−07 A 5 = −6.24072e−09 A 7 = −1.08703e−11 A 9 = −5.03203e−15 A11 = 5.50700e−18 A13 = 1.82229e−21 A15 = 3.22254e−25

30-th surface

K = 1.90377e+00 A 4 = 4.01683e−08 A 6 = 1.21219e−08 A 8 = 5.42643e−11 A10 = −5.92002e−15 A12 = 3.32588e−18 A14 = 3.39734e−20 A16 = 1.89067e−24
A 3 = −7.63348e−07 A 5 = −7.89396e−08 A 7 = −1.08224e−09 A 9 = −1.26694e−12 A11 = 8.61788e−16 A13 = −1.18177e−18 A15 = −4.13522e−22

Various data

| Zoom ratio | 160.00 | | |
|---|---|---|---|
| | Wide angle end | Intermediate | Telephoto End |
| Focal length | 8.50 | 210.60 | 1359.98 |
| F-number | 1.77 | 1.76 | 7.00 |
| Half angle of view | 32.91 | 1.50 | 0.23 |
| Image Height | 5.50 | 5.50 | 5.50 |
| Total lens length | 681.11 | 681.11 | 681.11 |
| BF | 12.90 | 12.90 | 12.90 |
| d12 | 4.27 | 175.40 | 188.47 |
| d19 | 297.58 | 94.87 | 2.00 |
| d21 | 6.63 | 4.69 | 1.46 |
| d26 | 4.79 | 4.05 | 3.64 |
| d31 | 3.03 | 37.29 | 120.75 |
| d57 | 12.90 | 12.90 | 12.90 |
| Entrance pupil position | 132.87 | 2525.33 | 21522.41 |
| Exit pupil position | 573.56 | 573.56 | 573.56 |
| Front principal point position | 141.50 | 2815.04 | 26181.25 |
| Rear principal point position | 4.40 | −197.70 | −1347.08 |

Zoom lens unit data

| Unit | Leading surface | Focal length | Lens structure length | Front principal point position | Rear principal point position |
|---|---|---|---|---|---|
| 1 | 1 | 243.98 | 124.75 | 70.39 | −19.87 |
| 2 | 13 | −22.00 | 30.71 | 4.71 | −15.27 |
| 3 | 20 | 136.68 | 10.03 | 0.82 | −4.88 |
| 4 | 22 | 2306.66 | 23.96 | −181.00 | −182.88 |
| 5 | 27 | 117.56 | 22.25 | 5.37 | −9.52 |
| 6 | 32 | 55.43 | 140.21 | 61.65 | 23.46 |

Numerical Embodiment 5

| Unit mm | | | | | |
|---|---|---|---|---|---|
| Surface data | | | | | |
| Surface number | r | d | nd | vd | Effective diameter |
| 1 | −2101.929 | 6.00 | 1.83481 | 42.7 | 218.34 |
| 2 | 342.328 | 1.50 | | | 205.58 |
| 3 | 340.607 | 24.50 | 1.43387 | 95.1 | 204.94 |
| 4 | −875.684 | 0.20 | | | 203.59 |
| 5 | 560.163 | 14.62 | 1.43387 | 95.1 | 198.75 |
| 6 | −1533.335 | 24.57 | | | 198.85 |
| 7 | 377.116 | 17.19 | 1.43387 | 95.1 | 199.03 |
| 8 | −4384.450 | 0.25 | | | 198.59 |
| 9 | 293.129 | 18.00 | 1.43387 | 95.1 | 194.06 |
| 10 | 3866.415 | 1.60 | | | 193.03 |
| 11 | 190.528 | 15.23 | 1.43387 | 95.1 | 180.54 |
| 12 | 412.617 | (variable) | | | 178.94 |
| 13* | −535.729 | 2.20 | 2.00330 | 28.3 | 44.50 |
| 14 | 32.743 | 10.74 | | | 37.34 |
| 15 | −53.839 | 1.45 | 1.80610 | 40.9 | 36.62 |
| 16 | 43.546 | 11.58 | 1.89286 | 20.4 | 37.52 |
| 17 | −54.689 | (variable) | | | 37.71 |
| 18 | −41.384 | 2.50 | 1.80518 | 25.4 | 36.31 |
| 19 | −37.207 | 1.50 | 1.83481 | 42.7 | 37.11 |
| 20 | −118.415 | (variable) | | | 39.36 |
| 21 | 118.835 | 11.27 | 1.78800 | 47.4 | 82.81 |
| 22* | −1393.025 | 3.88 | | | 82.66 |
| 23 | 119.092 | 16.81 | 1.43875 | 94.7 | 83.12 |
| 24 | −151.232 | 0.50 | | | 82.42 |
| 25 | 174.513 | 2.50 | 1.85478 | 24.8 | 76.46 |
| 26 | 73.619 | (variable) | | | 72.46 |
| 27 | 83.987 | 14.33 | 1.49700 | 81.5 | 72.35 |
| 28 | −287.336 | 2.60 | 1.84666 | 23.8 | 71.08 |
| 29 | −7693.666 | 0.20 | | | 70.10 |
| 30* | 307.100 | 6.85 | 1.53775 | 74.7 | 69.38 |
| 31 | −215.218 | (variable) | | | 68.61 |
| 32(stop) | ∞ | 2.61 | | | 34.92 |
| 33 | −1437.318 | 1.40 | 1.88300 | 40.8 | 33.21 |
| 34 | 38.725 | 0.77 | | | 31.58 |
| 35 | 32.559 | 5.07 | 1.80810 | 22.8 | 31.80 |
| 36 | 99.727 | 4.62 | | | 30.93 |
| 37 | −63.305 | 1.50 | 1.88300 | 40.8 | 30.15 |
| 38 | −315.783 | 8.22 | | | 30.11 |
| 39 | −173.845 | 1.50 | 1.89190 | 37.1 | 29.23 |
| 40 | 42.468 | 4.87 | 1.84666 | 23.8 | 29.34 |
| 41 | −447.471 | 2.98 | | | 29.42 |
| 42 | −67.619 | 1.50 | 1.88300 | 40.8 | 29.44 |
| 43 | 86.019 | 10.10 | 1.51742 | 52.4 | 30.42 |
| 4 | −31.109 | 9.67 | | | 31.99 |
| 45 | 63.074 | 4.92 | 1.53172 | 48.8 | 31.21 |
| 46 | −127.855 | 1.40 | | | 30.79 |
| 47 | −77.173 | 1.50 | 1.89190 | 37.1 | 30.41 |
| 48 | 34.257 | 7.50 | 1.48749 | 70.2 | 30.14 |
| 49 | −87.239 | 0.20 | | | 30.73 |
| 50 | 127.064 | 7.31 | 1.51633 | 64.1 | 31.12 |
| 51 | −33.484 | 1.50 | 1.88300 | 40.8 | 31.16 |
| 52 | −84.848 | 0.20 | | | 31.99 |
| 53 | 82.918 | 6.46 | 1.54814 | 45.8 | 32.21 |
| 54 | −48.094 | 10.00 | | | 32.00 |
| 55 | ∞ | 33.00 | 1.60859 | 46.4 | 60.00 |
| 56 | ∞ | 13.20 | 1.51633 | 64.2 | 60.00 |
| 57 | ∞ | 12.99 | | | 60.00 |
| image plane | ∞ | | | | |

Aspherical data 13-th surface

K = 3.58921e−01 A 4 = 1.88098e−06 A 6 = 2.39834e−08 A 8 = 7.59027e−10 A10 = 2.14113e−12 A12 = −3.65983e−15 A14 = −4.82700e−18 A16 = −3.60162e−22
A 3 = −1.47106e−07 A 5 = −4.52292e−08 A 7 = −5.85496e−09 A 9 = −5.62715e−11 A11 = −4.81713e−15 A13 = 1.89219e−16 A15 = 6.51550e−20

-continued

| Unit mm |
|---|
| 20-th surface |
| K = 0.00000e+00 A 4 = −2.38299e−07 A 6 = −1.23927e−11 A 8 = −7.52279e−14 |
| 22-nd surface |
| K = 2.00000e+00 A 4 = 3.49606e−07 A 6 = 2.24134e−10 A 8 = 3.17632e−13 A10 = −5.86994e−17 A12 = −1.49856e−19 A14 = −1.31141e−23 A16 = −5.48418e−27 A 3 = −9.98745e−08 A 5 = −2.69982e−09 A 7 = −1.11064e−11 A 9 = −4.22950e−15 A11 = 5.60505e−18 A13 = 1.58601e−21 A15 = 4.49484e−25 |
| 30-th surface |
| K = −2.00000e+00 A 4 = 7.24426e−08 A 6 = 1.28878e−08 A 8 = 5.47702e−11 A10 = −6.17749e−15 A12 = 2.87589e−18 A14 = 3.38425e−20 A16 = 1.96588e−24 A 3 = −6.71400e−07 A 5 = −8.77572e−08 A 7 = −1.11210e−09 A 9 = −1.26532e−12 A11 = 8.72399e−16 A13 = −1.16818e−18 A15 = −4.17308e−22 |

Various data

| Zoom ratio | 140.00 | | |
|---|---|---|---|
| | Wide angle end | Intermediate | Telephoto End |
| Focal length | 8.00 | 221.43 | 1119.99 |
| F-number | 1.77 | 1.77 | 5.82 |
| Half angle of view | 34.51 | 1.42 | 0.28 |
| Image Height | 5.50 | 5.50 | 5.50 |
| Total lens length | 682.98 | 682.98 | 682.98 |
| BF | 12.99 | 12.99 | 12.99 |
| d12 | 3.49 | 184.35 | 197.45 |
| d17 | 3.19 | 3.03 | 3.99 |
| d20 | 297.48 | 83.42 | 2.00 |
| d26 | 8.29 | 4.01 | 10.54 |
| d31 | 3.00 | 40.65 | 101.47 |
| d57 | 12.99 | 12.99 | 12.99 |
| Entrance pupil position | 128.08 | 2647.44 | 16280.31 |
| Exit pupil position | 258.47 | 258.47 | 258.47 |
| Front principal point position | 136.34 | 3068.60 | 22510.09 |
| Rear principal point position | 4.99 | −208.44 | −1107.00 |

Zoom lens unit data

| Unit | Leading surface | Focal length | Lens structure length | Front principal point position | Rear principal point position |
|---|---|---|---|---|---|
| 1 | 1 | 250.49 | 123.64 | 71.44 | −18.42 |
| 2 | 13 | −45.13 | 25.97 | −6.66 | −31.75 |
| 3 | 18 | −77.05 | 4.00 | −1.12 | −3.37 |
| 4 | 21 | 127.59 | 34.96 | −7.27 | −28.50 |
| 5 | 27 | 113.84 | 23.98 | 5.47 | −10.63 |
| 6 | 32 | 47.88 | 141.99 | 59.92 | 20.37 |

Numerical Embodiment 6

Unit mm

Surface data

| Surface number | r | d | nd | vd | Effective diameter |
|---|---|---|---|---|---|
| 1 | −1979.490 | 6.00 | 1.83481 | 42.7 | 216.00 |
| 2 | 356.735 | 1.60 | | | 203.78 |
| 3 | 355.588 | 24.20 | 1.43387 | 95.1 | 203.09 |
| 4 | −773.722 | 0.20 | | | 201.73 |
| 5 | 556.581 | 14.23 | 1.43387 | 95.1 | 198.42 |
| 6 | 1751.765 | 24.14 | | | 198.49 |
| 7 | 403.411 | 15.77 | 1.43387 | 95.1 | 198.20 |
| 8 | −6837.871 | 0.25 | | | 197.78 |
| 9 | 286.795 | 18.64 | 1.43387 | 95.1 | 193.51 |
| 10 | 5493.466 | 1.60 | | | 192.50 |
| 11 | 190.061 | 15.47 | 1.43387 | 95.1 | 179.87 |
| 12 | 424.696 | (variable) | | | 178.28 |
| 13* | 487.277 | 1.80 | 1.90366 | 31.3 | 44.35 |

-continued

| Unit mm | | | | | |
|---|---|---|---|---|---|
| 14 | 43.289 | 7.54 | | | 38.60 |
| 15 | −128.946 | 1.80 | 1.88300 | 40.8 | 36.92 |
| 16 | 43.897 | 4.92 | 1.43875 | 94.7 | 34.69 |
| 17 | 110.906 | 4.45 | | | 34.23 |
| 18 | −54.799 | 1.80 | 1.90525 | 35.0 | 34.18 |
| 19 | 87.973 | 5.16 | 1.89286 | 20.4 | 37.20 |
| 20 | −117.643 | 0.14 | | | 38.22 |
| 21 | 267.405 | 8.16 | 1.80518 | 25.4 | 40.56 |
| 22 | −39.052 | 1.82 | 1.80400 | 46.5 | 41.18 |
| 23 | −289.280 | (variable) | | | 43.96 |
| 24 | 266.014 | 13.34 | 1.49700 | 81.5 | 86.51 |
| 25* | −128.569 | 0.20 | | | 87.24 |
| 26 | 231.088 | 11.04 | 1.43875 | 94.7 | 88.47 |
| 27 | −242.563 | 2.52 | 1.59270 | 35.3 | 88.35 |
| 28 | 401.146 | (variable) | | | 88.30 |
| 29 | 118.659 | 13.66 | 1.43875 | 94.7 | 89.53 |
| 30 | −347.072 | 0.12 | | | 89.20 |
| 31* | 417.397 | 4.97 | 1.43875 | 94.7 | 87.72 |
| 32 | −485.991 | 0.23 | | | 87.28 |
| 33 | 443.462 | 2.41 | 1.85025 | 30.1 | 85.40 |
| 34 | 136.534 | 14.00 | 1.43875 | 94.7 | 83.17 |
| 35 | −175.018 | (variable) | | | 82.56 |
| 36(stop) | ∞ | 5.74 | | | 40.56 |
| 37 | −132.613 | 1.30 | 1.80100 | 35.0 | 37.96 |
| 38 | 78.613 | 0.12 | | | 37.07 |
| 39 | 44.330 | 4.61 | 1.84666 | 23.8 | 37.19 |
| 40 | 164.209 | 2.50 | | | 36.60 |
| 41 | −130.313 | 1.30 | 1.64000 | 60.1 | 36.50 |
| 42 | 103.456 | 8.00 | | | 35.69 |
| 43 | −446.160 | 2.45 | 1.80100 | 35.0 | 35.11 |
| 44 | 49.371 | 16.95 | 1.80518 | 25.4 | 35.00 |
| 45 | −57.577 | 1.65 | | | 34.78 |
| 46 | −39.653 | 1.80 | 1.77250 | 49.6 | 34.55 |
| 47 | 41.027 | 8.70 | 1.53172 | 48.8 | 35.72 |
| 48 | −55.585 | 0.12 | | | 36.20 |
| 49 | −242.138 | 3.16 | 1.56732 | 42.8 | 36.45 |
| 50 | −91.852 | 8.51 | | | 36.69 |
| 51 | −59.298 | 4.28 | 1.54814 | 45.8 | 36.36 |
| 52 | −33.892 | 0.58 | | | 36.70 |
| 53 | −100.095 | 9.19 | 2.00069 | 25.5 | 34.77 |
| 54 | 55.943 | 1.22 | | | 34.38 |
| 55 | 49.611 | 11.26 | 1.53172 | 48.8 | 35.58 |
| 56 | −45.485 | 0.12 | | | 36.07 |
| 57 | 55.692 | 7.68 | 1.59551 | 39.2 | 34.16 |
| 58 | −40.526 | 2.10 | 2.00069 | 25.5 | 33.59 |
| 59 | −113.434 | 13.00 | | | 33.00 |
| 60 | ∞ | 33.00 | 1.60859 | 46.4 | 60.00 |
| 61 | ∞ | 13.20 | 1.51633 | 64.2 | 60.00 |
| 62 | ∞ | 13.25 | | | 60.00 |
| image plane | ∞ | | | | |

Aspherical data 13-th surface

K = 0.00000e+00 A 4 = 1.71364e−07 A 6 = −4.86825e−08 A 8 = −8.88400e−10 A10 = −2.96153e−12 A12 = −4.72336e−15 A14 = 2.75739e−18 A16 = 1.70315e−21
A 3 = 1.87120e−07 A 5 = 1.38289e−07 A 7 = 8.66794e−09 A 9 = 5.88775e−11 A11 = 1.33121e−13 A13 = 6.57385e−17 A15 = −1.34271e−19

25-th surface

K = 0.00000e+00 A 4 = 1.74550e−07 A 6 = −4.97174e−10 A 8 = −3.23403e−12 A10 = −2.49644e−15 A12 = 5.29486e−19 A14 = 2.55506e−22 A16 = −2.59288e−26
A 3 = −5.72878e−07 A 5 = −1.20232e−09 A 7 = 5.78346e−11 A 9 = 1.11014e−13 A11 = 2.65894e−17 A13 = −2.41331e−20 A15 = 1.14297e−24

31-st surface

K = 0.00000e+00 A 4 = −1.48026e−07 A 6 = 1.53986e−10 A 8 = −2.35867e−12 A10 = −1.18763e−15 A12 = 4.70615e−19 A14 = −1.15016e−22 A16 = −2.67386e−26
A 3 = −8.82590e−07 A 5 = −9.69861e−09 A 7 = 2.75235e−11 A 9 = 8.16021e−14 A11 = −5.17598e−18 A13 = −4.78599e−21 A15 = 3.49613e−24

-continued

| Unit mm | | | |
|---|---|---|---|
| Various data | | | |
| Zoom ratio | 144.44 | | |
| | Wide angle end | Intermediate | Telephoto End |
| Focal length | 8.10 | 251.82 | 1169.94 |
| F-number | 1.76 | 1.77 | 6.08 |
| Half angle of view | 34.18 | 1.25 | 0.27 |
| Image Height | 5.50 | 5.50 | 5.50 |
| Total lens length | 715.83 | 715.83 | 715.83 |
| BF | 13.25 | 13.25 | 13.25 |
| d12 | 2.70 | 180.00 | 194.11 |
| d23 | 301.19 | 73.33 | 1.50 |
| d28 | 11.02 | 2.65 | 1.50 |
| d35 | 2.98 | 61.91 | 120.78 |
| d62 | 13.25 | 13.25 | 13.25 |
| Entrance pupil position | 128.50 | 2659.69 | 16159.86 |
| Exit pupil position | 508.91 | 508.91 | 508.91 |
| Front principal point position | 136.73 | 3039.45 | 20091.29 |
| Rear principal point position | 5.15 | −238.57 | −1156.69 |

| Zoom lens unit data | | | | | |
|---|---|---|---|---|---|
| Unit | Leading surface | Focal length | Lens structure length | Front principal point position | Rear principal point position |
| 1 | 1 | 248.34 | 122.09 | 69.94 | −19.01 |
| 2 | 13 | −22.50 | 37.58 | 4.34 | −23.27 |
| 3 | 24 | 178.58 | 27.10 | 2.62 | −15.49 |
| 4 | 29 | 125.39 | 35.38 | 9.48 | −15.69 |
| 5 | 36 | 63.45 | 162.54 | 72.79 | 14.14 |

Numerical Embodiment 7

| Unit mm | | | | | |
|---|---|---|---|---|---|
| Surface data | | | | | |
| Surface number | r | d | nd | vd | Effective diameter |
| 1 | −2209.695 | 6.00 | 1.83481 | 42.7 | 218.26 |
| 2 | 341.889 | 1.50 | | | 205.58 |
| 3 | 339.919 | 24.40 | 1.43387 | 95.1 | 204.95 |
| 4 | −889.124 | 0.20 | | | 203.62 |
| 5 | 559.308 | 14.37 | 1.43387 | 95.1 | 198.48 |
| 6 | −1638.781 | 24.63 | | | 198.58 |
| 7 | 382.453 | 17.03 | 1.43387 | 95.1 | 198.80 |
| 8 | −4097.047 | 0.25 | | | 198.38 |
| 9 | 294.905 | 18.08 | 1.43387 | 95.1 | 193.93 |
| 10 | 4765.116 | 1.60 | | | 192.91 |
| 11 | 191.673 | 15.16 | 1.43387 | 95.1 | 181.00 |
| 12 | 419.037 | (variable) | | | 179.59 |
| 13* | −289.959 | 2.20 | 2.00330 | 28.3 | 45.81 |
| 14 | 37.660 | 10.53 | | | 38.99 |
| 15 | −55.227 | 1.45 | 1.80610 | 40.9 | 38.11 |
| 16 | 45.332 | 6.03 | 1.89286 | 20.4 | 38.72 |
| 17 | −840.505 | (variable) | | | 38.75 |
| 18 | −526.771 | 5.06 | 1.89286 | 20.4 | 38.74 |
| 19 | −49.365 | 3.33 | | | 38.78 |
| 20 | −38.563 | 2.00 | 1.83481 | 42.7 | 36.79 |
| 21 | −141.380 | (variable) | | | 39.10 |
| 22 | 120.942 | 10.34 | 1.78800 | 47.4 | 83.55 |
| 23* | −694.900 | 2.79 | | | 83.45 |
| 24 | 121.227 | 16.19 | 1.43875 | 94.7 | 83.53 |
| 25 | −150.560 | 0.48 | | | 82.90 |
| 26 | 179.392 | 2.50 | 1.85478 | 24.8 | 76.56 |
| 27 | 74.396 | (variable) | | | 72.46 |
| 28 | 90.094 | 13.43 | 1.49700 | 81.5 | 72.06 |
| 29 | −300.995 | 2.60 | 1.84666 | 23.8 | 70.84 |
| 30 | 6830.305 | 0.20 | | | 69.83 |
| 31* | 290.609 | 6.90 | 1.53775 | 74.7 | 69.12 |

-continued

| Unit mm | | | | | |
|---|---|---|---|---|---|
| 32 | −225.074 | (variable) | | | 68.34 |
| 33(stop) | ∞ | 3.22 | | | 35.10 |
| 34 | −1087.040 | 1.40 | 1.88300 | 40.8 | 33.00 |
| 35 | 41.815 | 0.71 | | | 31.48 |
| 36 | 34.073 | 4.37 | 1.8081 | 22.8 | 31.61 |
| 37 | 95.174 | 4.66 | | | 30.90 |
| 38 | −63.843 | 1.50 | 1.88300 | 40.8 | 30.14 |
| 39 | −203.028 | 8.14 | | | 30.10 |
| 40 | −128.165 | 1.50 | 1.89190 | 37.1 | 28.89 |
| 41 | 42.391 | 5.22 | 1.84666 | 23.8 | 29.02 |
| 42 | −164.006 | 3.28 | | | 29.11 |
| 43 | −44.925 | 1.50 | 1.88300 | 40.8 | 29.01 |
| 44 | 133.399 | 8.33 | 1.51742 | 52.4 | 30.34 |
| 45 | −29.390 | 10.79 | | | 31.52 |
| 46 | 82.663 | 4.80 | 1.53172 | 48.8 | 31.35 |
| 47 | −94.767 | 1.40 | | | 31.06 |
| 48 | −89.200 | 1.50 | 1.89190 | 37.1 | 30.51 |
| 49 | 34.307 | 8.58 | 1.48749 | 70.2 | 30.24 |
| 50 | −69.136 | 0.20 | | | 30.98 |
| 51 | 125.204 | 7.61 | 1.51633 | 64.1 | 31.30 |
| 52 | −32.816 | 1.50 | 1.88300 | 40.8 | 31.26 |
| 53 | −93.692 | 0.20 | | | 32.06 |
| 54 | 89.512 | 6.60 | 1.54814 | 45.8 | 32.25 |
| 55 | −46.999 | 10.00 | | | 32.05 |
| 56 | ∞ | 33.00 | 1.60859 | 46.4 | 60.00 |
| 57 | ∞ | 13.20 | 1.51633 | 64.2 | 60.00 |
| 58 | ∞ | 13.00 | | | 60.00 |
| image plane | ∞ | | | | |

Aspherical data 13-th surface

K = −1.15600e+00 A 4 = 2.06167e−06 A 6 = 2.37163e−08 A 8 = 7.71464e−10 A10 = 2.13881e−12 A12 = −3.64738e−15 A14 = −4.78375e−18 A16 = −3.39020e−22
A 3 = 2.47197e−07 A 5 = −3.95002e−08 A 7 = −5.93337e−09 A 9 = −5.68527e−11 A11 = −4.22622e−15 A13 = 1.87969e−16 A15 = 6.37161e−20

23-th surface

K = −1.99999e+00 A 4 = 3.67612e−07 A 6 = 2.05049e−10 A 8 = 2.53553e−13 A10 = −2.49940e−17 A12 = −1.58306e−19 A14 = −1.48454e−23 A16 = −5.38308e−27
A 3 = −1.09998e−07 A 5 = −2.77004e−09 A 7 = −9.40643e−12 A 9 = −3.75874e−15 A11 = 4.92123e−18 A13 = 1.91359e−21 A15 = 4.34738e−25

31-st surface

K = −1.30139e+00 A 4 = 1.82753e−07 A 6 = 1.28586e−08 A 8 = 5.44389e−11 A10 = −6.62904e−15 A12 = 3.45636e−18 A14 = 3.39906e−20 A16 = 1.94990e−24
A 3 = −9.50776e−07 A 5 = −8.91812e−08 A 7 = −1.10762e−09 A 9 = −1.24702e−12 A11 = 8.66524e−16 A13 = −1.18162e−18 A15 = −4.17343e−22

Various data

Zoom ratio 144.43

| | Wide angle end | Intermediate | Telephoto End |
|---|---|---|---|
| Focal length | 8.10 | 219.95 | 1169.92 |
| F-number | 1.76 | 1.76 | 6.08 |
| Half angle of view | 34.18 | 1.43 | 0.27 |
| Image Height | 5.50 | 5.50 | 5.50 |
| Total lens length | 681.21 | 681.21 | 681.21 |
| BF | 13.00 | 13.00 | 13.00 |
| d12 | 3.85 | 183.66 | 196.76 |
| d17 | 0.99 | 1.95 | 2.02 |
| d21 | 299.35 | 86.05 | 2.99 |
| d27 | 8.67 | 3.73 | 6.93 |
| d32 | 2.88 | 40.36 | 107.05 |
| d58 | 13.00 | 13.00 | 13.00 |
| Entrance pupil position | 129.68 | 2617.63 | 17135.57 |
| Exit pupil position | 223.58 | 223.58 | 223.58 |
| Front principal point position | 138.09 | 3067.31 | 24805.18 |
| Rear principal point position | 4.90 | −206.95 | −1156.92 |

-continued

| Unit mm | | | | | |
|---|---|---|---|---|---|
| Zoom lens unit data | | | | | |
| Unit | Leading surface | Focal length | Lens structure length | Front principal point position | Rear principal point position |
| 1 | 1 | 250.77 | 123.22 | 71.35 | −18.31 |
| 2 | 13 | −21.98 | 20.21 | 3.53 | −11.30 |
| 3 | 18 | 600.00 | 10.40 | −22.01 | −27.99 |
| 4 | 22 | 121.73 | 32.30 | −6.44 | −25.95 |
| 5 | 28 | 121.42 | 23.12 | 5.31 | −10.16 |
| 6 | 33 | 46.53 | 143.21 | 60.30 | 19.95 |

TABLE 1

| Table 1 | | | | | | | |
|---|---|---|---|---|---|---|---|
| | Numerical Embodiment | | | | | | |
| Inequality | 1 | 2 | 3 | 4 | 5 | 6 | 7 |
| (1) ft/f1 | 4.648 | 4.408 | 4.592 | 5.574 | 4.471 | 4.711 | 4.665 |
| (2) \|mn/mp\| | 1.889 | 1.743 | 1.765 | 1.565 | 1.934 | 1.625 | 1.883 |
| (3) fw/f1 | 0.032 | 0.034 | 0.033 | 0.035 | 0.032 | 0.033 | 0.032 |
| (4) $(\beta vt/\beta vw)^2 \times (fw/ft)$ | 3.272 | 3.391 | 2.734 | 2.922 | 3.503 | 3.935 | 3.240 |
| (5) βcfz | −0.758 | −0.819 | −0.879 | −0.725 | −0.766 | −1.000 | −0.763 |
| (6) dt/dw | 0.884 | 0.367 | 0.179 | — | 1.271 | 0.136 | 0.799 |
| (7) f1/fvw | −11.179 | −10.822 | −11.364 | −11.091 | −11.237 | −11.038 | −11.176 |
| (8) fvw/fcw | −0.311 | −0.290 | −0.303 | −0.302 | −0.306 | −0.269 | −0.309 |
| (9) f1n/f1 | −1.402 | −1.385 | −1.419 | −1.405 | −1.398 | −1.448 | −1.405 |
| (10) ν1n | 42.74 | 42.74 | 42.74 | 42.74 | 42.74 | 42.74 | 42.74 |
| (11) νpave | 95.10 | 95.01 | 95.10 | 95.10 | 95.10 | 95.10 | 95.10 |
| (12) ft/fw | 144.44 | 130.00 | 140.00 | 160.00 | 140.00 | 144.44 | 144.434 |
| (13) \|f1/f1n\| | 0.713 | 0.722 | 0.705 | 0.712 | 0.715 | 0.691 | 0.712 |
| fw | 8.100 | 7.900 | 8.200 | 8.500 | 8.000 | 8.100 | 8.100 |
| ft | 1169.951 | 1026.970 | 1147.977 | 1359.982 | 1119.991 | 1169.941 | 1169.919 |
| f1 | 251.689 | 233.000 | 249.999 | 243.983 | 250.487 | 248.344 | 250.767 |
| mn | 193.938 | 179.600 | 191.395 | 184.200 | 194.757 | 191.412 | 192.912 |
| mp | −102.666 | −103.035 | −108.442 | −117.713 | −100.722 | −117.796 | −102.423 |
| βvw | −0.111 | −0.114 | −0.109 | −0.114 | −0.110 | −0.113 | −0.111 |
| βvt | −2.408 | −2.397 | −2.134 | −2.463 | −2.430 | −2.684 | −2.400 |
| dw | 9.845 | 10.204 | 15.106 | — | 8.293 | 11.022 | 8.673 |
| dt | 8.698 | 3.748 | 2.709 | — | 10.544 | 1.500 | 6.929 |
| fvw | −22.514 | −21.530 | −21.999 | −21.998 | −22.292 | −22.498 | −22.439 |
| fcw | 72.375 | 74.169 | 72.675 | 72.814 | 72.927 | 83.560 | 72.733 |
| f1n | −352.973 | −322.707 | −354.776 | −342.898 | −350.293 | −359.650 | −352.327 |

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-024542, filed Feb. 21, 2022, which is hereby incorporated by reference herein in its entirety.

What is claimed is:

1. A zoom lens comprising in order from an object side to an image side:

a first lens unit having a positive refractive power and configured not to move for zooming;

a first intermediate unit which consists of at least one lens unit having a negative refractive power and configured to move toward the image side for zooming from a wide angle end to a telephoto end; and a second intermediate unit which consists of at least two lens units each having a positive refractive power and configured to move toward the object side for zooming from the wide angle end to the telephoto end, wherein an interval between each pair of adjacent lens units is changed during zooming, wherein the first lens unit includes a biconcave lens disposed closest to the object side, wherein a lens unit included in the at least one lens unit having the negative refractive power and having a largest amount of movement during zooming from the wide angle end to the telephoto end is defined as an N lens unit, and a lens unit included in the at least two lens units each having the positive refractive power and having a largest amount of movement during zooming from the wide angle end to the telephoto end is defined as a P lens unit;

wherein the following inequalities are satisfied, $$4.35 < ft/f1 < 6.00$$

$$1.0 < |mn/mp| \leq 1.934$$

$$0.02 < fw/f1 < 0.035$$

where f1 represents a focal length of the first lens unit, fw represents a focal length of the zoom lens at the wide angle end, ft represents a focal length of the zoom lens at the telephoto end, mn represents a difference between a distance from the N lens unit to an image plane at the wide-angle end and a distance from the N lens unit to the image plane at the telephoto end, and mp represents a difference between distances from the P lens unit to the image plane at the wide-angle end and a distance from the P lens unit to the image plane at the telephoto end.

2. The zoom lens according to claim 1, wherein a V lens group is defined as the first intermediate unit, and the following inequality is satisfied, $$2.0 < (\beta vt/\beta vw)^2 \times (fw/ft) < 5.0$$

where βvw represents a combined lateral magnification of the V lens group at the wide angle end, and βvt represents a combined lateral magnification of the V lens groups at the telephoto end.

3. The zoom lens according to claim 2, wherein the V lens group has a state in which a combined lateral magnification is −1, wherein a C lens group is defined as the second intermediate unit, and the following inequality is satisfied, $$-1.00 < \beta cfz < -0.65$$

where βcfz represents a combined lateral magnification of the C lens group at a state of the combined lateral magnification of the V lens group being −1.

4. The zoom lens according to claim 2, wherein the V lens group has a state in which a combined lateral magnification is −1, wherein a C lens group is defined as the second intermediate unit, and wherein a combined lateral magnification of the C lens group is −1 when the combined lateral magnification of the V lens group is −1.

5. The zoom lens according to claim 3, wherein the C lens group consists of a P1 lens unit having a positive refractive power and a P2 lens unit having a positive refractive power, wherein the following inequality is satisfied, $$0.1 < dt/dw < 2.0$$

where dw represents an air-equivalent interval on an optical axis between the P1 lens unit and the P2 lens unit at the wide angle end and dt represents an interval on the optical axis between adjacent surfaces of the P1 lens unit and the P2 lens unit at the telephoto end.

6. The zoom lens according to claim 1, wherein a V lens group is defined as the first intermediate unit, and the following inequality is satisfied, $$-15.0 < f1/fvw < -9.0$$

where fvw represents a combined focal length of the V lens group at the wide angle end.

7. The zoom lens according to claim 1, wherein a V lens group is defined as the first intermediate unit, and a C lens group is defined as the second intermediate unit, wherein the following inequality is satisfied, $$-.50 < fvw/fcw < -0.15$$

where fvw represents a combined focal length of the V lens group at the wide angle end, and fcw represents a combined focal length of the C lens group at the wide angle end.

8. The zoom lens according to claim 1, wherein the following inequality is satisfied, $$-1.65 < f1n/f1 < -1.10$$

$$37 < \nu 1n < 48$$

where f1n represents a focal length of the biconcave lens and ν1n represents an Abbe number of the biconcave lens with respect to d-line.

9. The zoom lens according to claim 1, wherein the following inequality is satisfied, $$80 < \nu pave < 100$$

where νpave represents an average of Abbe numbers with respect to d-line of positive lenses included in the first lens unit.

10. The zoom lens according to claim 1, wherein the following inequality is satisfied, $$125 < ft/fw < 200.$$

11. The zoom lens according to claim 1, wherein the following inequality is satisfied, $$1.0 < |mn/mp| \le 1.889.$$

12. The zoom lens according to claim 1, wherein the following inequality is satisfied, $$1.625 \le |mn/mp| \le 1.889.$$

13. An image pickup apparatus comprising a zoom lens and an image pickup element configured to pickup an image formed by the zoom lens, wherein the zoom lens comprises in order from an object side to an image side:

a first lens unit having a positive refractive power and configured not to move for zooming;

a first intermediate unit which consists of at least one lens unit having a negative refractive power and configured to move toward the image side for zooming from a wide angle end to a telephoto end; and a second intermediate unit which consists of at least two lens units each having a positive refractive power and configured to move toward the object side for zooming from the wide angle end to the telephoto end, wherein an interval between each pair of adjacent lens units is changed during zooming, wherein the first lens unit includes a biconcave lens disposed closest to the object side, wherein a lens unit included in the at least one lens unit having the negative refractive power and having a largest amount of movement during zooming from the wide angle end to the telephoto end is defined as an N lens unit, and a lens unit included in the at least two lens units each having the positive refractive power and having a largest amount of movement during zooming from the wide angle end to the telephoto end is defined as a P lens unit;

wherein the following inequalities are satisfied, $$4.35 < ft/f1 < 6.00$$

$$1.0 < |mn/mp| \leq 1.934$$

$$0.02 < fw/f1 < 0.035$$

where f1 represents a focal length of the first lens unit, fw represents a focal length of the zoom lens at the wide angle end, ft represents a focal length of the zoom lens at the telephoto end, mn represents a difference between a distance from the N lens unit to an image plane at the wide-angle end and a distance from the N lens unit to the image plane at the telephoto end, and mp represents a difference between distances from the P lens unit to the image plane at the wide-angle end and a distance from the P lens unit to the image plane at the telephoto end.

14. The image pickup apparatus according to claim 13, wherein the following inequality is satisfied, $$1.0 < |mn/mp| \leq 1.889.$$

15. The image pickup apparatus according to claim 13, wherein the following inequality is satisfied, $$1.625 \leq |mn/mp| \leq 1.889.$$

* * * * *